(12) United States Patent
Kanemaru

(10) Patent No.: US 10,889,065 B2
(45) Date of Patent: Jan. 12, 2021

(54) TUBE JOINING DEVICE

(71) Applicant: TERUMO KABUSHIKI KAISHA, Tokyo (JP)

(72) Inventor: Keisuke Kanemaru, Kanagawa (JP)

(73) Assignee: Terumo Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/496,364

(22) PCT Filed: Mar. 23, 2018

(86) PCT No.: PCT/JP2018/011687
§ 371 (c)(1),
(2) Date: Sep. 20, 2019

(87) PCT Pub. No.: WO2018/174246
PCT Pub. Date: Sep. 27, 2018

(65) Prior Publication Data
US 2020/0047422 A1   Feb. 13, 2020

(30) Foreign Application Priority Data

Mar. 24, 2017   (JP) .................................. 2017-059270

(51) Int. Cl.
| | | |
|---|---|---|
| *B29C 65/20* | (2006.01) | |
| *B29C 65/74* | (2006.01) | |
| *B29C 65/78* | (2006.01) | |
| *B29C 65/00* | (2006.01) | |
| *F16L 13/02* | (2006.01) | |

(52) U.S. Cl.
CPC ........ *B29C 65/743* (2013.01); *B29C 66/5221* (2013.01); *B29C 66/8227* (2013.01); *B29C 66/857* (2013.01); *F16L 13/02* (2013.01)

(58) Field of Classification Search
CPC ..... A61M 39/146; A61M 39/18; B29C 65/20; B29C 65/2046; B29C 65/743; B29C 65/7802; B29C 65/7841; B29C 65/7897; B29C 66/0018; B29C 66/1142; B29C 66/5221; B29C 66/71; B29C 66/7373; B29C 66/73921; B29C 66/8221; B29C 66/8227; B29C 66/857; B29L 2023/007; F16L 13/02
See application file for complete search history.

(56) References Cited

U.S. PATENT DOCUMENTS 5,802,689 A * 9/1998 Sano .................... B29C 66/857
                                                29/33 T
6,026,882 A * 2/2000 Yamada .............. A61M 39/146
                                                156/433

(Continued)

FOREIGN PATENT DOCUMENTS

| JP | 2015-136576 A | 7/2015 | |
| JP | 2015136575 A * | 7/2015 | ......... B29C 65/7802 |

*Primary Examiner* — Michael A Tolin
(74) *Attorney, Agent, or Firm* — Terumo BCT, Inc IP Law Dept

(57) ABSTRACT

A tube joining device which is capable of preventing occurrence of a joining failure. The tube joining device includes: a first tube holding portion for holding a first tube; a second tube holding portion for holding a second tube; a tube superimposing portion that aligns the first tube and the second tube; and a switching mechanism switching from a state of holding the second tube to a state of releasing the second tube.

9 Claims, 16 Drawing Sheets

(56) References Cited

U.S. PATENT DOCUMENTS

| | | | | |
|---|---|---|---|---|
| 6,460,592 | B1* | 10/2002 | Sano | .................... A61M 39/146 156/503 |
| 6,463,979 | B1* | 10/2002 | Sano | .................... B29C 65/7841 156/503 |
| 8,857,485 | B2* | 10/2014 | Buhler | .............. B29C 66/73921 156/353 |
| 2002/0174956 | A1* | 11/2002 | Sano | .................... B29C 66/857 156/503 |

* cited by examiner

TUBE JOINING DEVICE

TECHNICAL FIELD

The present invention relates to a tube joining device that is used in joining of a tube.

BACKGROUND ART

As a technology of connecting tubes formed from a resin to each other, there has been known a joining method in which ends of the tubes formed from a resin are fused and the fused ends are pressed for pressure-joining. The technology has been widely used in various industrial fields, and as an example thereof, an application to a medical technology such as a peritoneal dialysis method has been attempted.

The peritoneal dialysis method is a method in which a predetermined dialysis fluid is put into a body by using a tube (catheter) that is inserted into the abdominal cavity of a patient, and water or waste matters which are transferred to the dialysis fluid through the peritoneum are removed to the outside of the body. When putting the dialysis fluid into the body, the tube that is inserted into the patient is liquid-tightly joined to a tube of a bag in which the dialysis fluid is accommodated. In addition, even when discharging the dialysis fluid from the inside of the body, the tube inserted into the patient is liquid-tightly joined to a tube of a liquid discharge bag.

As described above, one tube that becomes a joining target is inserted into the abdominal cavity of the patient. Accordingly, during joining work, it is necessary to pay the closest attention to the work in order for each tube not to be contaminated. In consideration of such circumstances, for example, as described in Patent Literature 1, a tube joining device capable of automatically performing joining in an aseptic condition by fusing two tubes formed from a resin is developed. In the device, fused ends of the two tubes are replaced and joined, and thus there is no concern of bacterium contamination during joining, and it is possible to maintain sterilization of the tube, the dialysis fluid in the bag, and the like. In addition, in the device, the two tubes are superimposed in an upper and lower direction (height direction) of the device and are set to a close contact state, and a plate-shaped metal wafer that is heated is moved to approach the tubes to perform fusing.

CITATION LIST

Patent Literature

Patent Literature 1: JP 2013-146354 A

SUMMARY OF INVENTION

Technical Problem

In the case of using the above-described tube joining device, a user such as a patient manually superimposes and sets respective tubes which become a joining target in the device. However, at this time, the tubes have flexibility, and thus the user may fail in handling of the tubes, and may superimpose the tubes in a distorted state or may superimpose the tubes in a three-folded state. When performing fusing-joining work by the device in a state in which the tube is set as described above, the tubes are joined, but a joining failure such as hole occurs at a joining portion.

In addition, in the tube joining device, when joining respective tubes, holding (setting) of the respective tubes is released at once, and the tubes are rotated to replace ends of the tubes. According to this, in the tube joining device, it is necessary to provide a mechanism for automatically releasing the holding of the tubes at an appropriate timing. However, when adding the mechanism, there is a concern that a device configuration becomes complicated.

The invention has been made in consideration of such circumstances, and an object thereof is to provide a tube joining device which is capable of preventing occurrence of a joining failure caused by a setting error of tubes in advance, and in which tube holding and release of the holding are realized by a simple device configuration.

Solution to Problem

According to an aspect of the invention, there is provided a tube joining device that fuses an end of a first tube and an end of a second tube by a plate-shaped cutting member that is heated, and replaces the fused end of the first tube and the fused end of the second tube and joins the fused ends in an aseptic condition. The tube joining device includes: a first tube holding portion that is capable of holding one tube between the first tube and the second tube; a second tube holding portion that is capable of holding the other tube between the first tube and the second tube; a tube superimposing portion that causes the first tube holding portion and the second tube holding portion to relatively approach each other to dispose the one tube and the other tube in a superimposed manner; and a switching mechanism that is capable of switching holding of the other tube by the second tube holding portion and release of the holding. The switching mechanism applies a biasing force for maintaining a state in which the other tube is held to the second tube holding portion, and applies a biasing force for maintaining a state in which the holding of the other tube is released to the second tube holding portion in accordance with the relative approaching of the first tube holding portion and the second tube holding portion.

Advantageous Effects of Invention

According to the tube joining device according to the invention, a user individually sets the tubes in the first and second tube holding portions, and performs an operation of causing the tube holding portions to relatively approach each other. According to this, the user can easily and appropriately dispose the tubes in a superimposed state. It is not necessary to manually perform work of superimposing the tubes on each other, and thus it is possible to prevent a work error such as setting of the tubes in a distorted state from occurring, and it is possible to prevent a joining failure caused by a tube setting error from occurring in advance. Tube holding and release of the holding are realized by a simple device configuration including the switching mechanism.

BRIEF DESCRIPTION OF DRAWINGS

Figure 1:
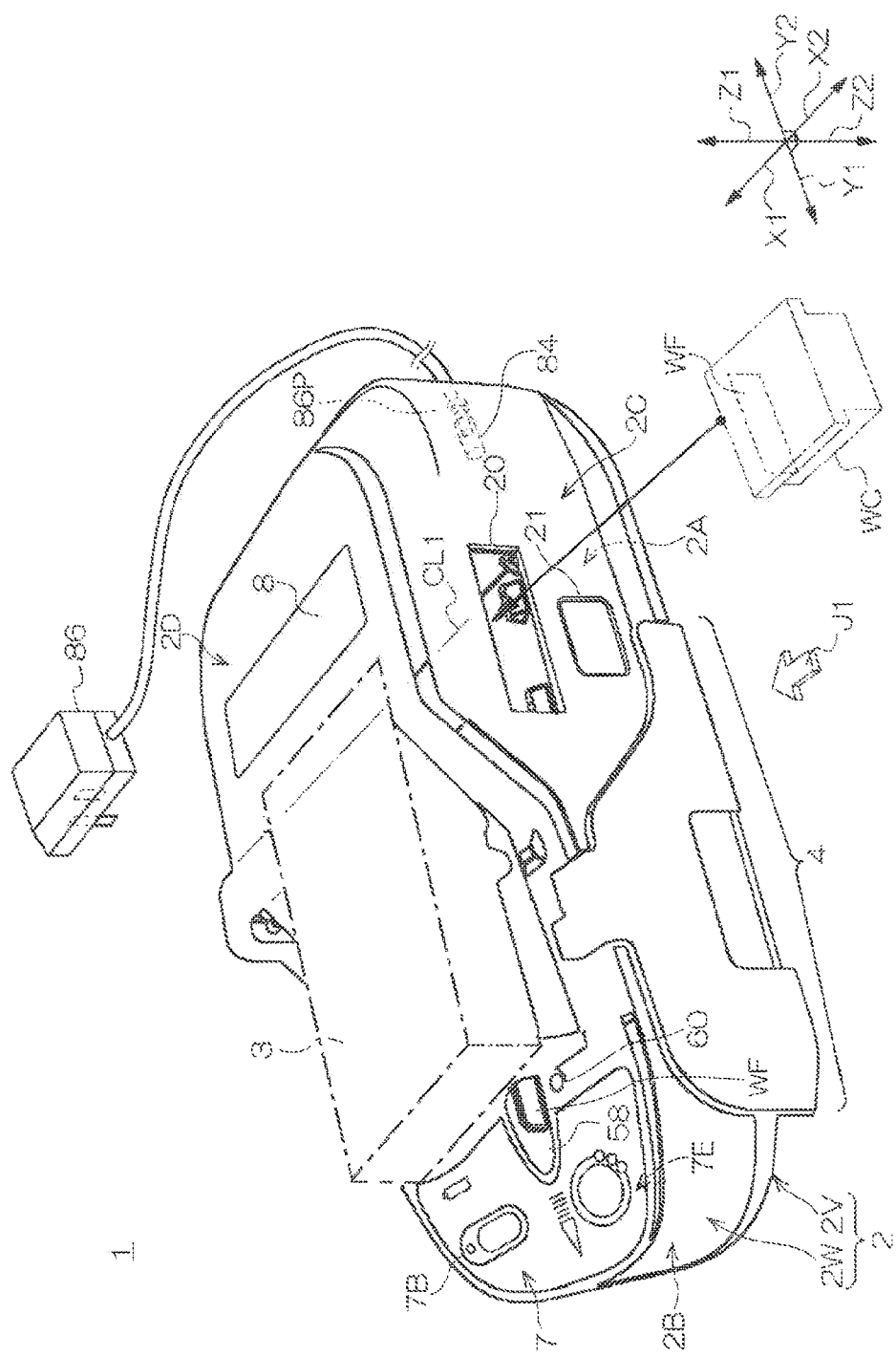
FIG. 1 is a perspective view illustrating a tube joining device according to an embodiment of the invention.

FIG. 2B is a view illustrating a configuration example of a display unit that is provided on a top surface portion of the housing illustrated in FIG. 1.

Figure 3:
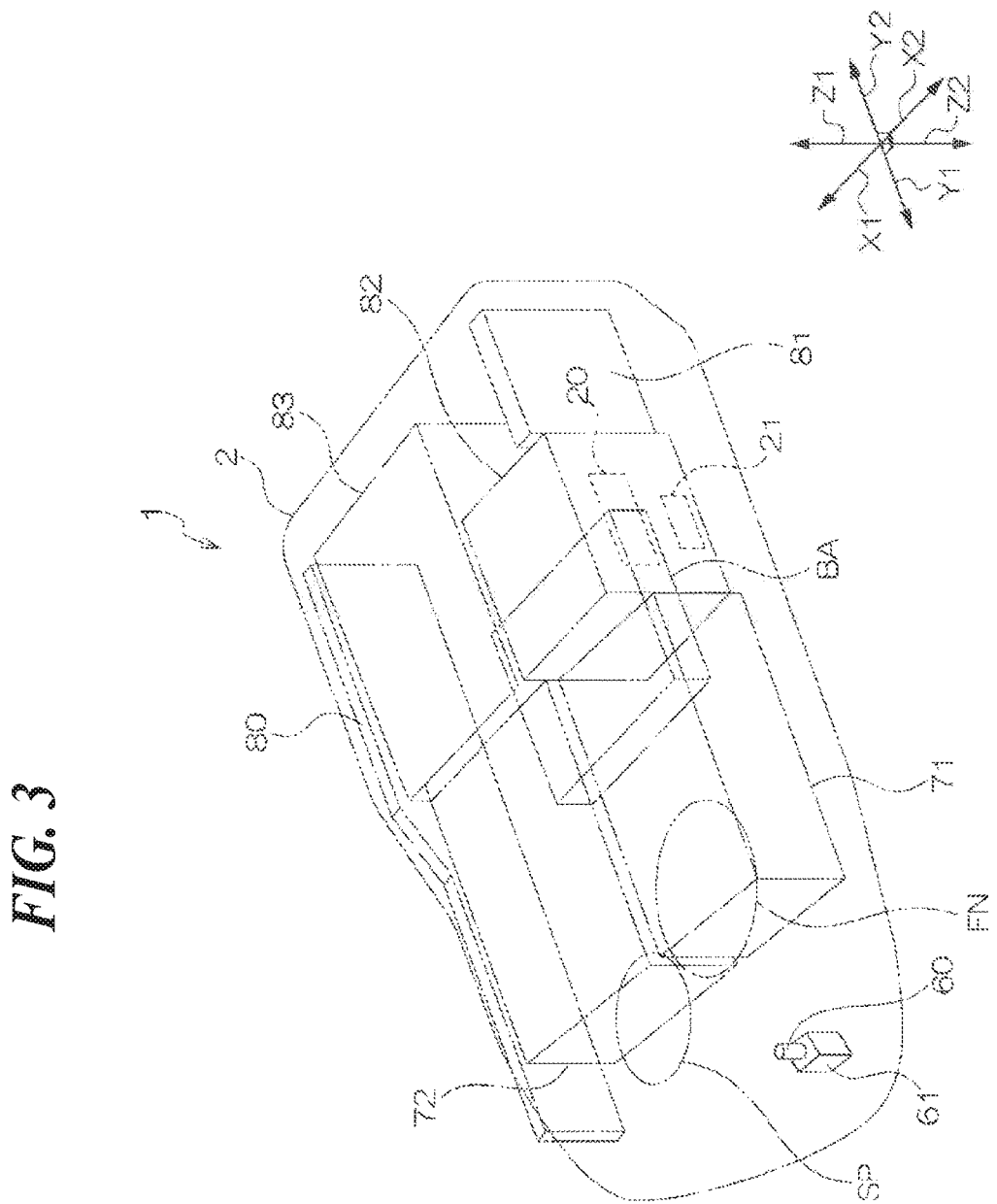

FIG. 3 is a perspective view illustrating a schematic arrangement example of constituent elements which are disposed in the housing of the tube joining device.

Figure 4:
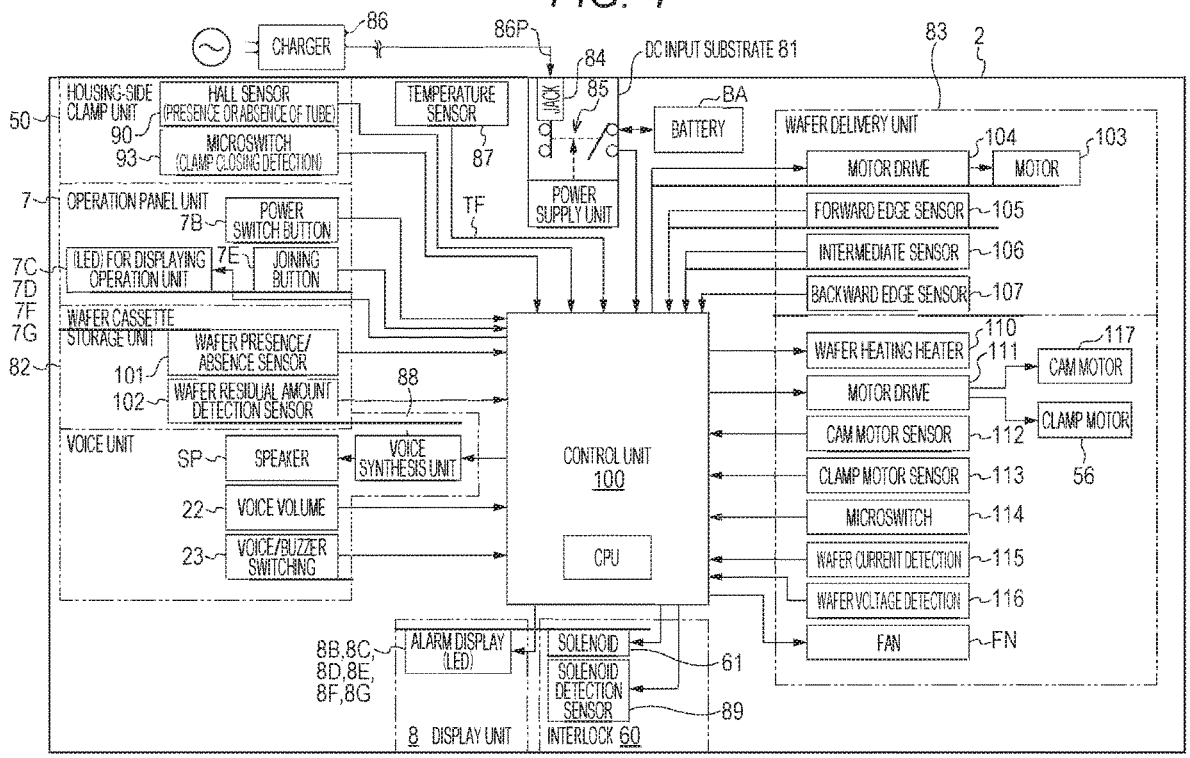

FIG. 4 is a view illustrating an electric block of a control system of the tube joining device.

Figure 5A:
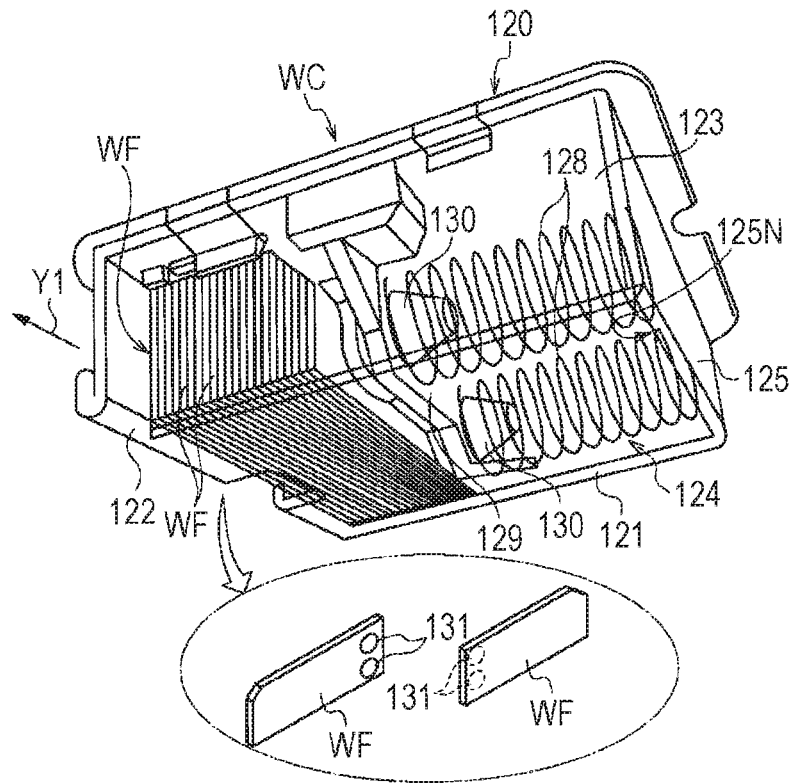
Figure 5B:
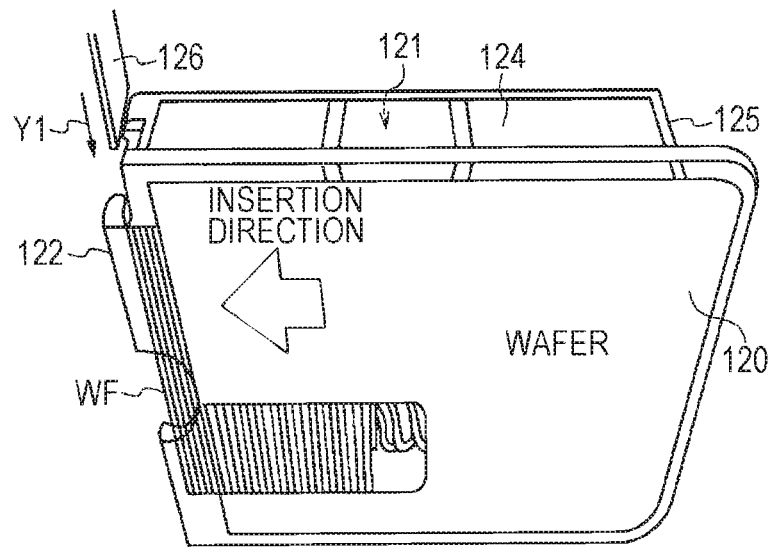

FIG. 5A is a perspective view illustrating a bottom surface portion of a wafer cassette, and FIG. 5B is a perspective view illustrating a top surface portion of the wafer cassette.

Figure 6:
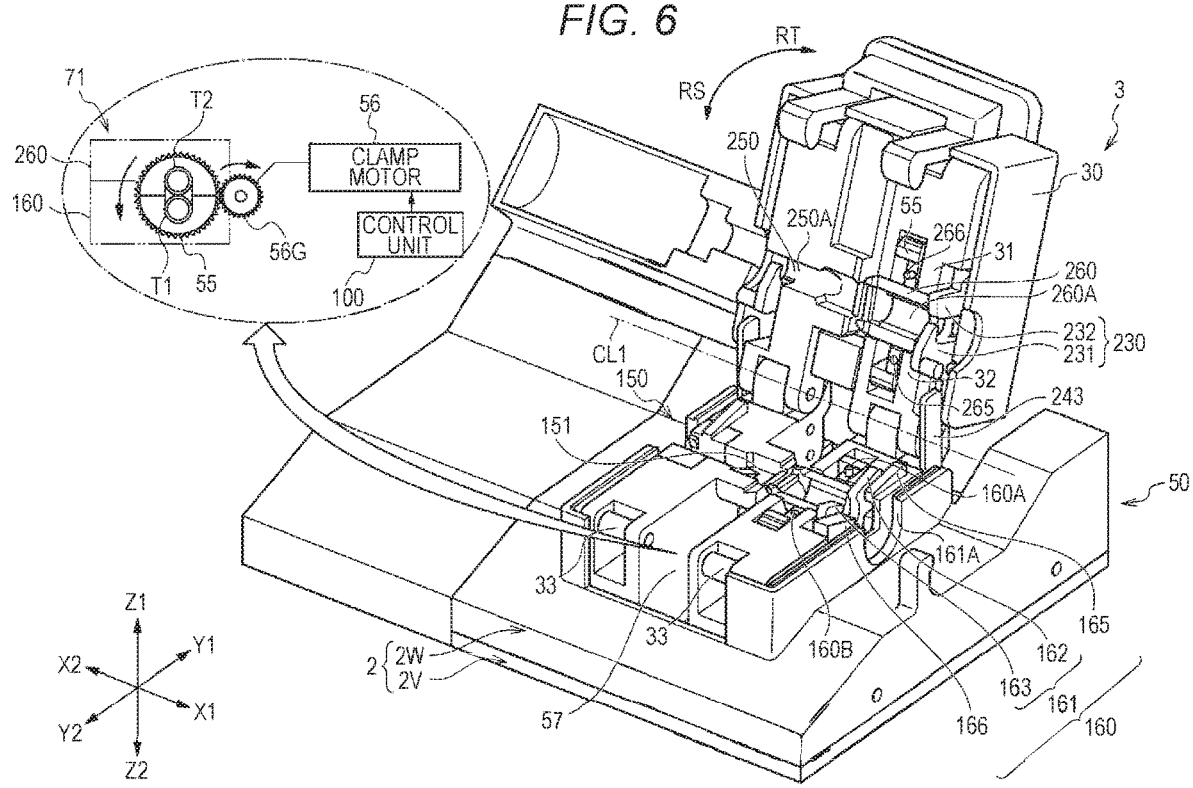

FIG. 6 is a perspective view illustrating main portions of the tube joining device in a state in which a clamp cover section is opened.

Figure 7:
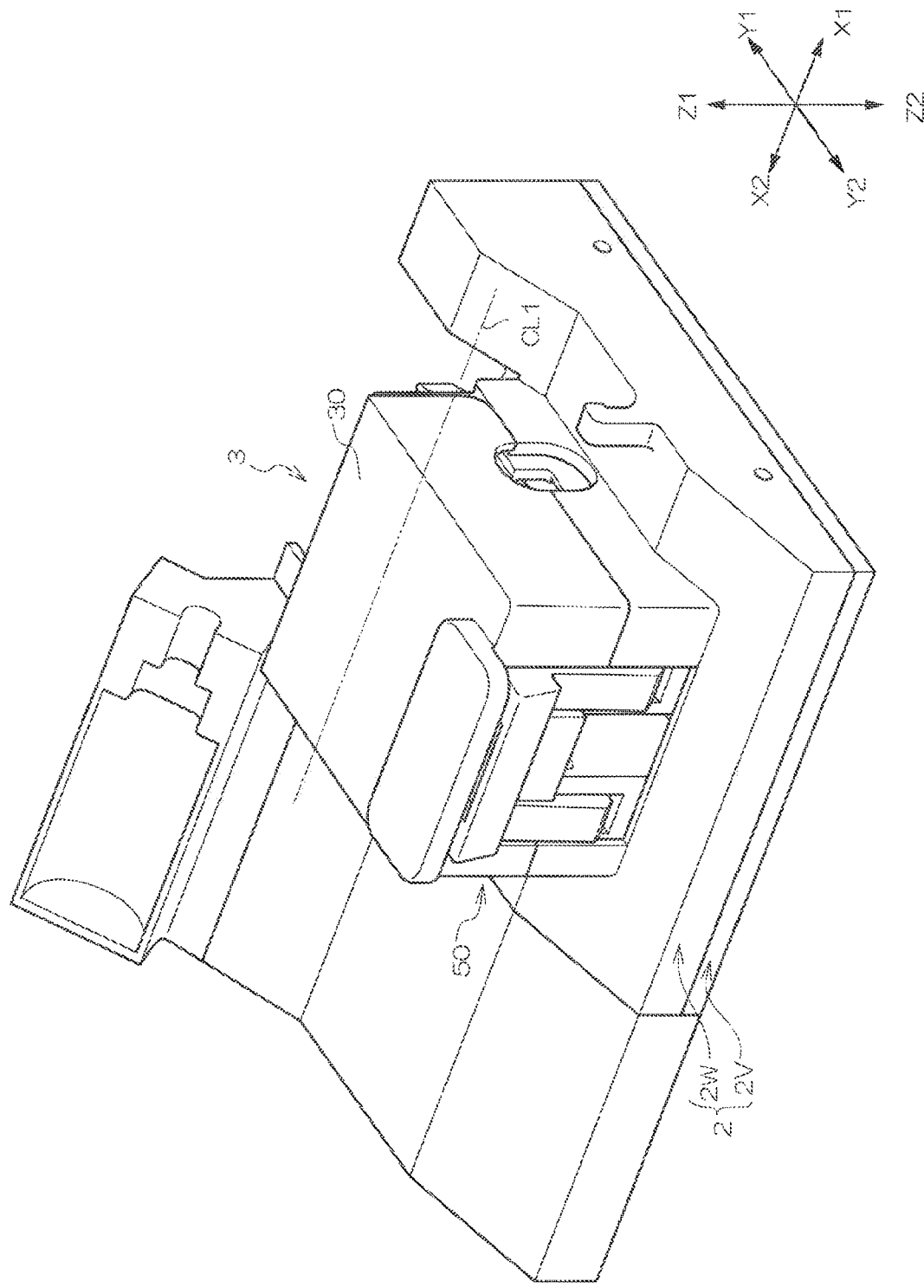

FIG. 7 is a perspective view illustrating main portions of the tube joining device in a state in which the clamp cover section is closed.

Figure 8:
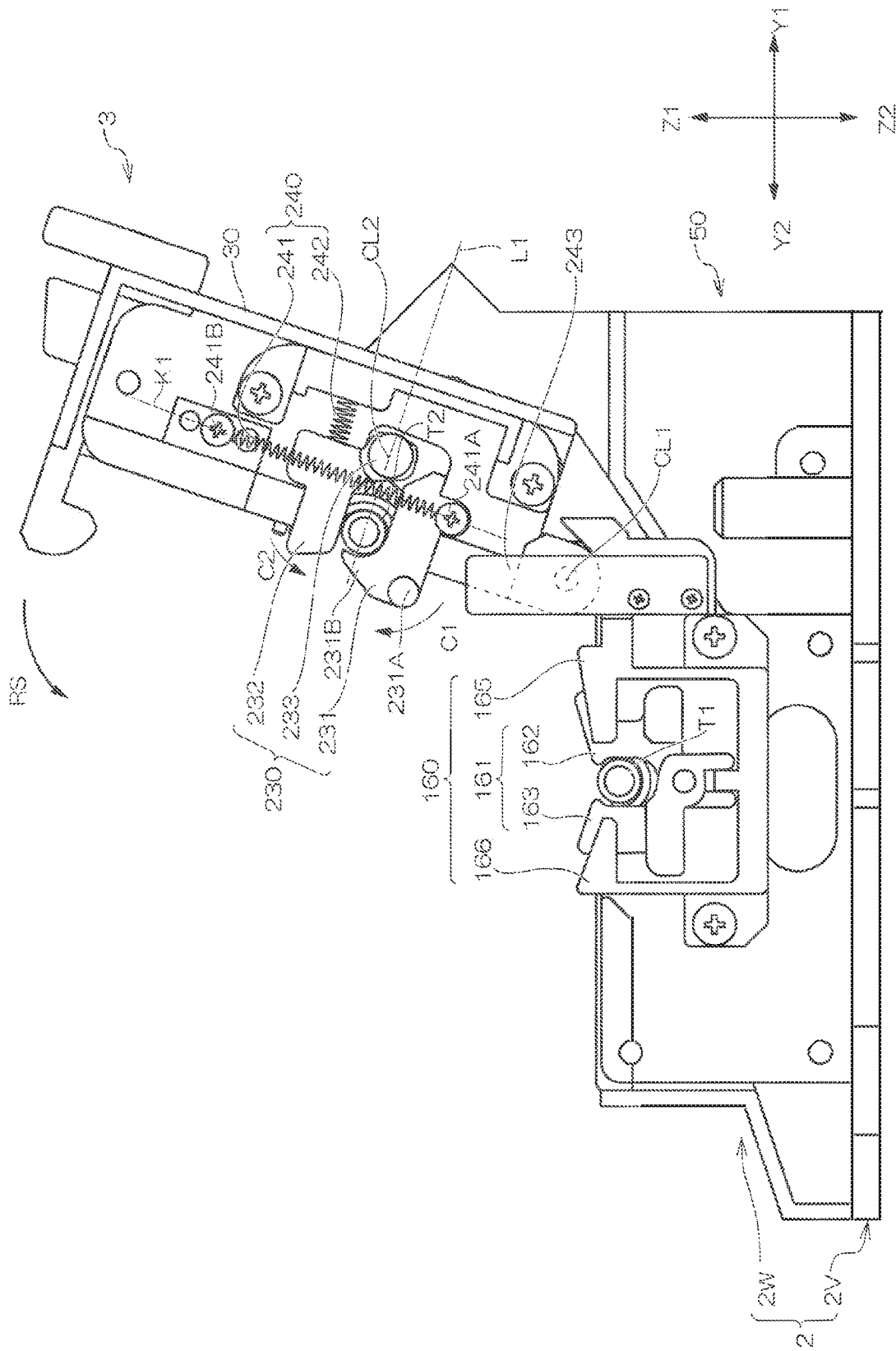

FIG. 8 is a side view illustrating main portions of the tube joining device in a state in which the clamp cover section is opened.

Figure 9:
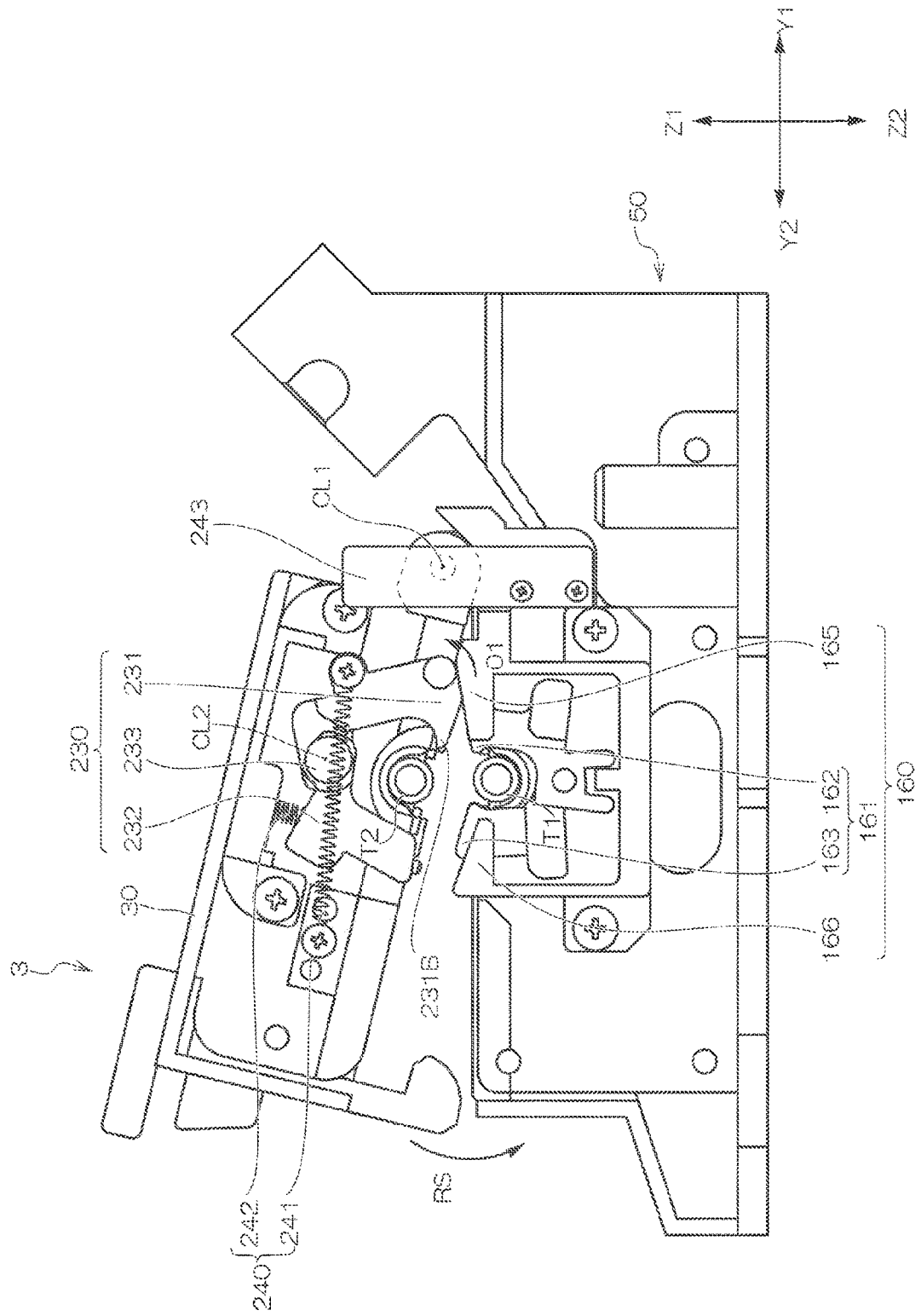

FIG. 9 is a side view illustrating main portions of the tube joining device for explaining the course of closing the clamp cover section.

Figure 10:
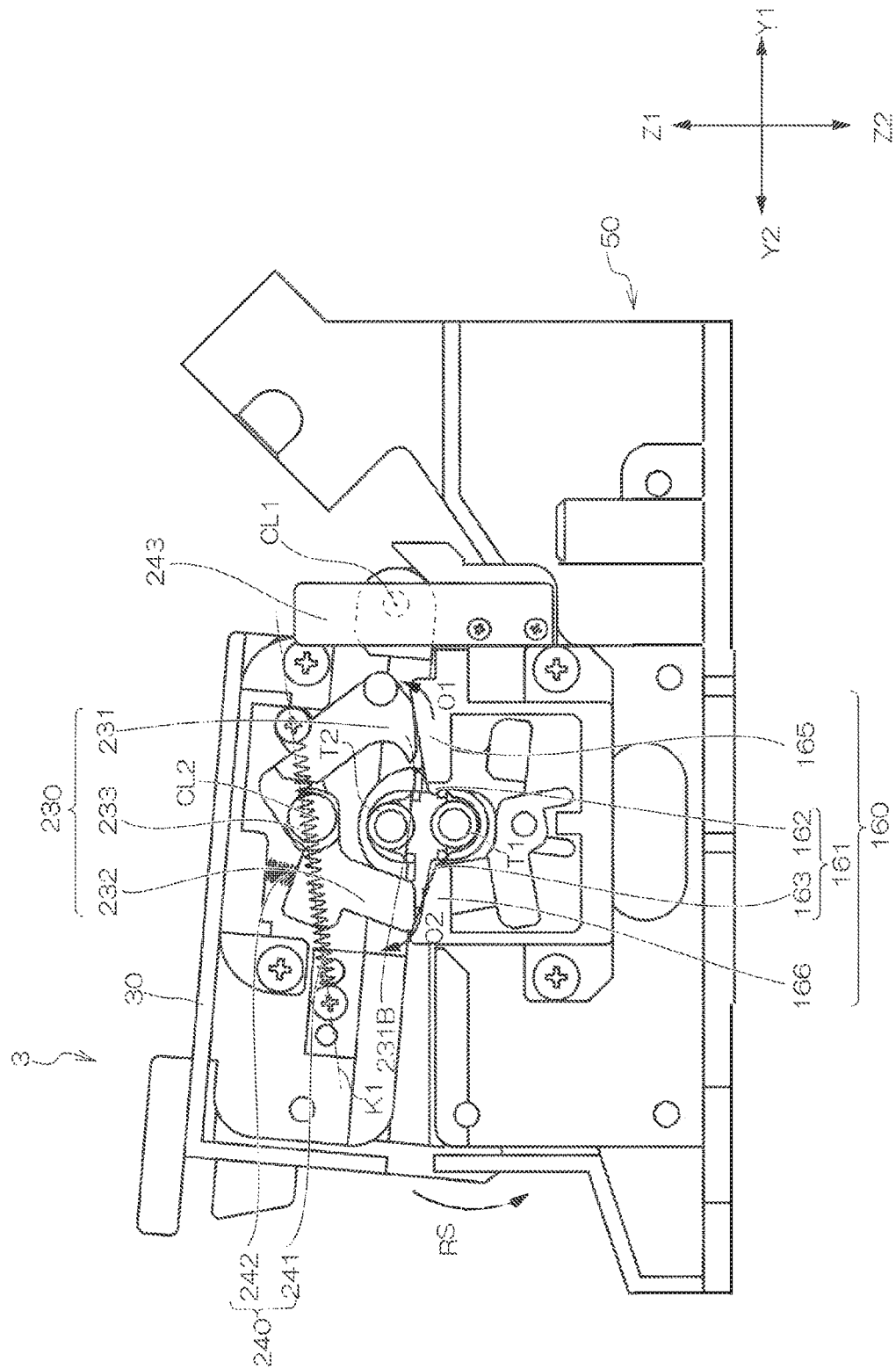

FIG. 10 is a side view illustrating main portions of the tube joining device for explaining the course of closing the clamp cover section.

Figure 11:
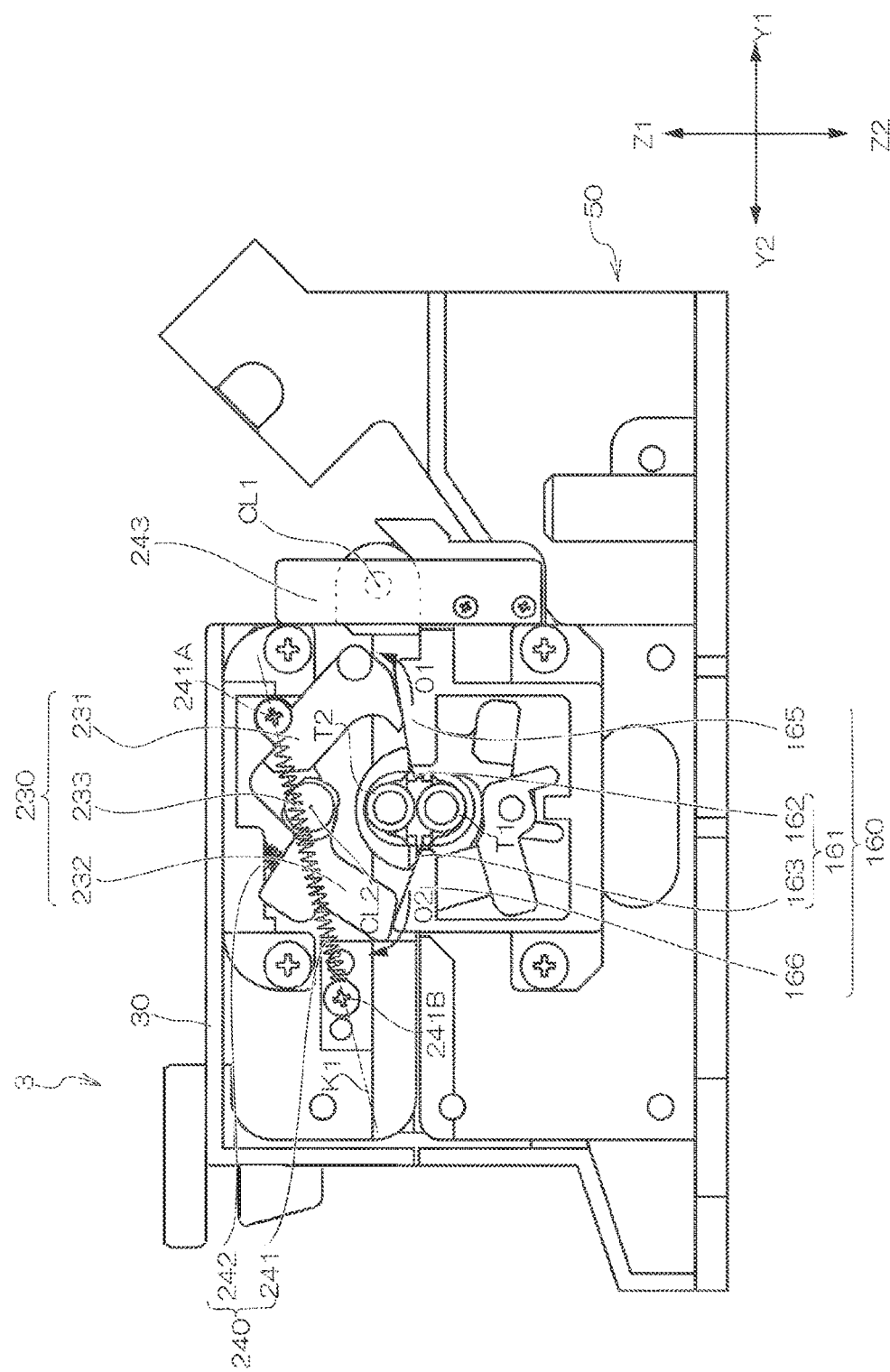

FIG. 11 is a side view illustrating main portions of the tube joining device in a state in which the clamp cover section is closed.

Figure 12:
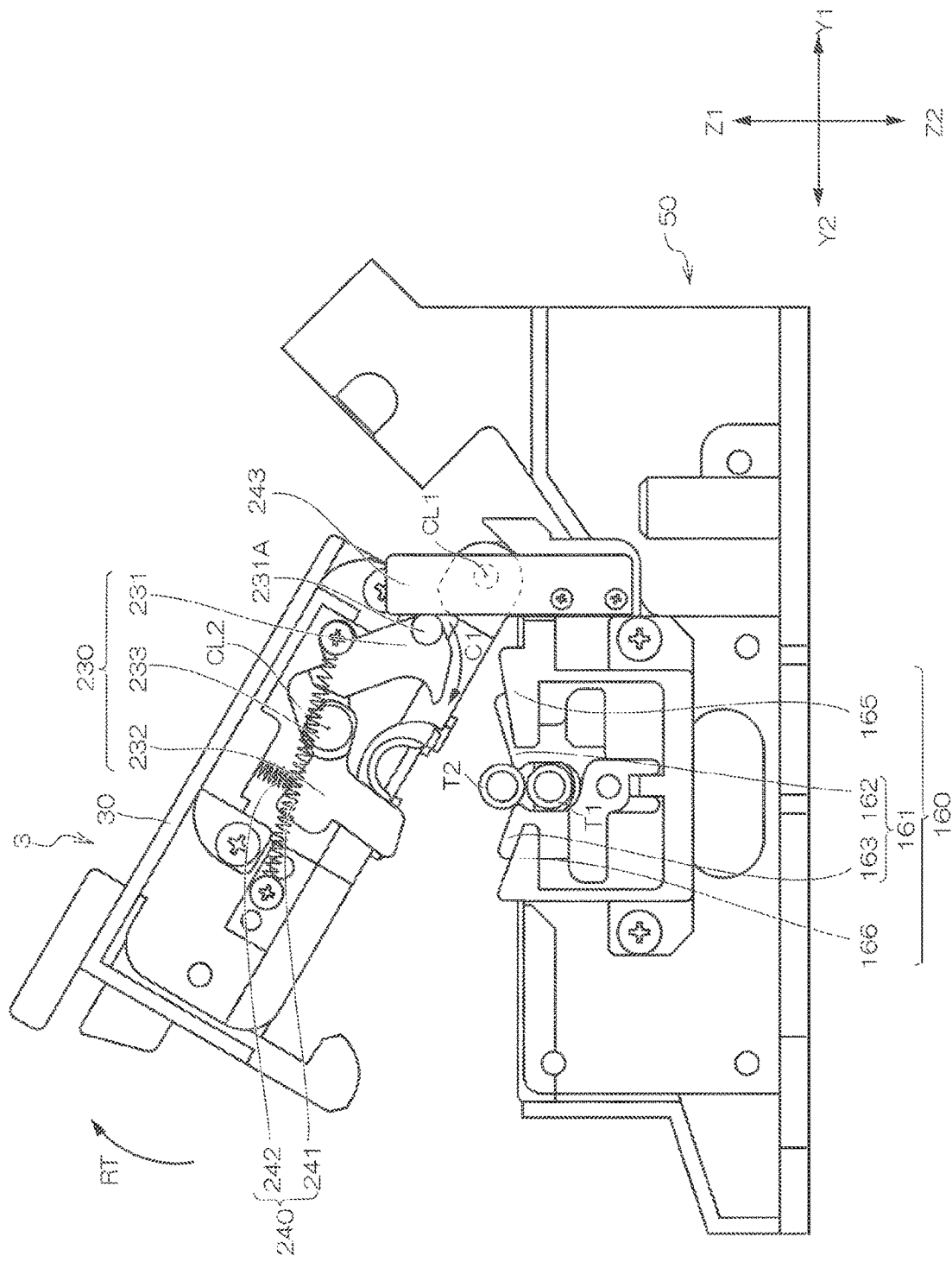

FIG. 12 is a side view illustrating main portions of the tube joining device for explaining the course of opening the clamp cover section from the closed state.

Figure 13:
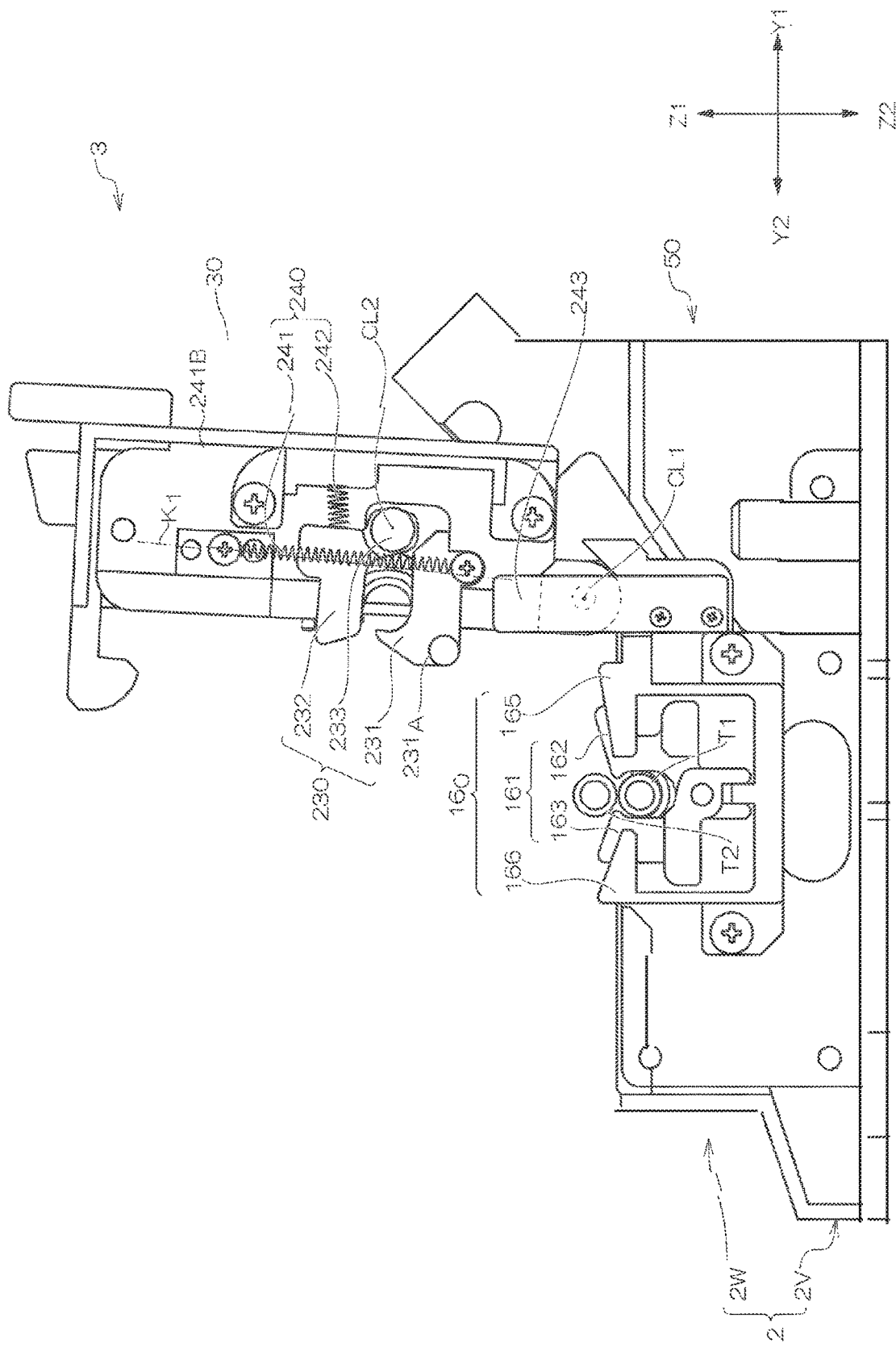

FIG. 13 is a side view illustrating main portions of the tube joining device for explaining the course of opening the clamp cover section from the closed state.

Figure 14:
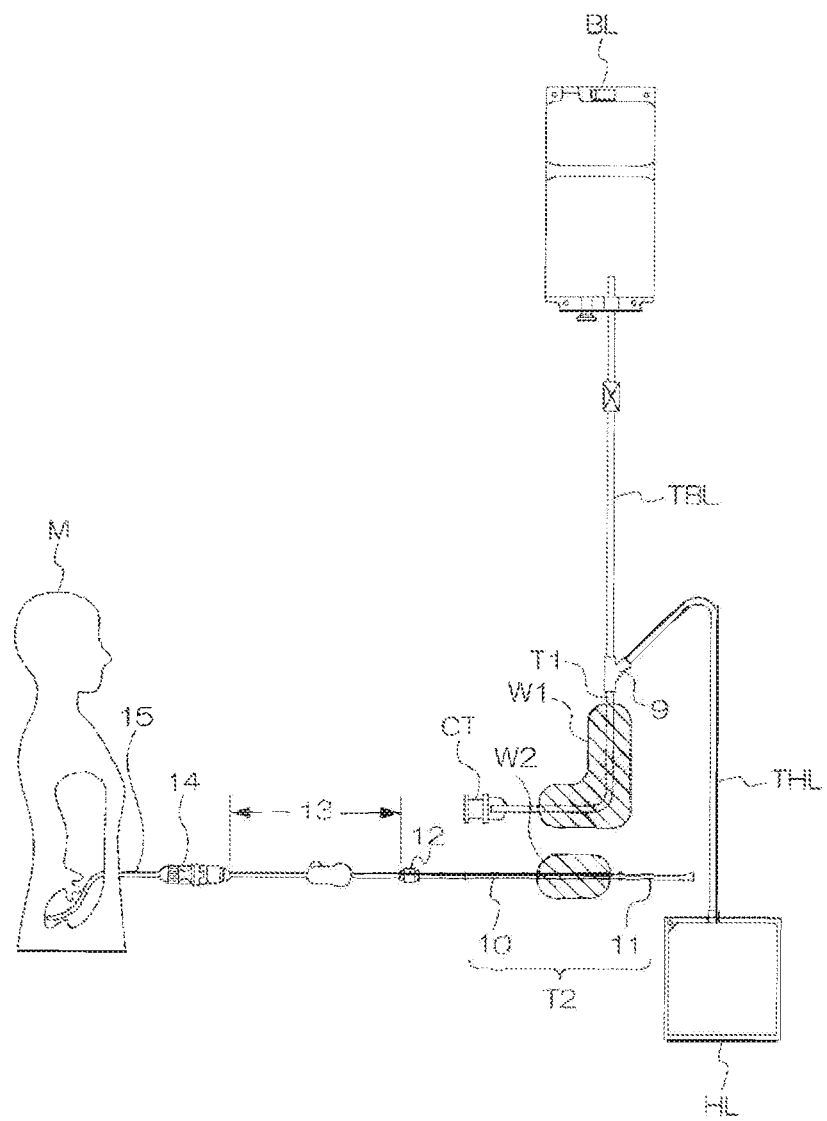

FIG. 14 is a view schematically illustrating tubes which are joined by the tube joining device according to the embodiment.

FIGS. 15A, 15B, 15C and 15D are views schematically illustrating respective processes of fusing-joining work by the tube joining device.

Figure 16A:
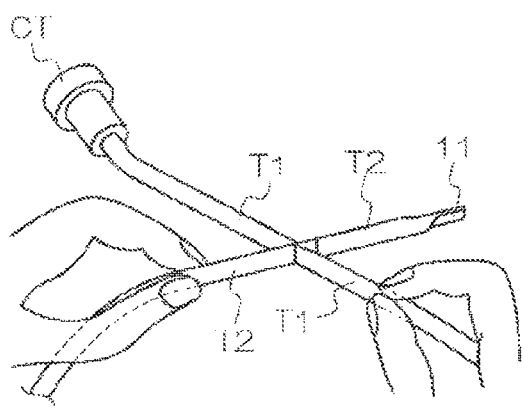
Figure 16B:
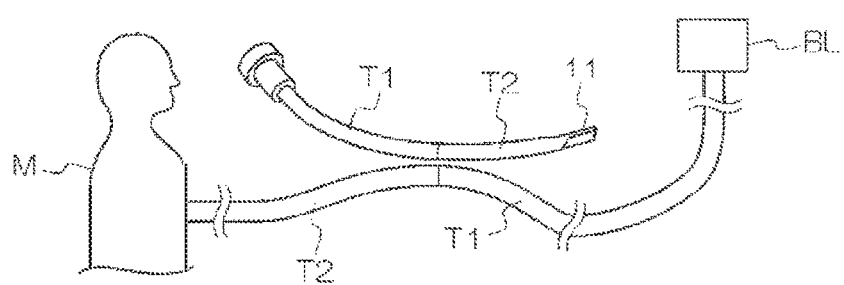

FIGS. 16A and 16B are views is a vices illustrating tubes after joining, and FIG. 16A is a view illustrating the tubes after joining in an enlarged manner and FIG. 16B is a view schematically illustrating an installation state of the tubes after joining.

DESCRIPTION OF EMBODIMENTS

Hereinafter, an embodiment of the invention will be described with reference to the accompanying drawings. Furthermore, dimension ratios in the drawings are exaggerated for convenience of explanation, and may be different from actual ratios.

A tube joining device 1 fuses ends of a plurality of tubes T1 and T2 (hereinafter, referred to as a first tube T1 and a second tube T2), and presses and joins the fused ends in an aseptic condition. In this embodiment, description will be given of the tube joining device with reference to an example that is applied to a medical device that is used in joining of a dialysis fluid tube (corresponding to the first tube T1) of a peritoneal dialysis fluid bag, and a peritoneal catheter side tube (corresponding to the second tube T2), which is used when performing peritoneal dialysis, of a user M such as a patient (refer to FIG. 14).

As illustrated in FIGS. 15A to 15D and FIGS. 16A to 16B, the tube joining device 1 has a configuration in which an end of the first tube T1 and an end of the second tube T2 are fused by a heated wafer WF (corresponding to a plate-shaped cutting member), and replaces and joins the fused end of the first tube T1 and the fused end of the second tube T2.

Respective configurations of the tube joining device 1 will be described.

For example, a preferred use environment of the tube joining device 1 is an environmental temperature of 10° C. to 40° C. and a relative humidity of 30% to 85%. However, the use environment is not particularly limited as long as the ends of the tubes T1 and T2 can be pressure-welded.

As illustrated in FIG. 1, for example, the tube joining device 1 includes a housing 2 and a clamp cover section 3 (corresponding to a cover section).

For example, the housing 2 has a size of 135 mm (width)×99 mm (height)×268 mm (depth), and a weight of approximately 2.4 kg.

Figure 2A:
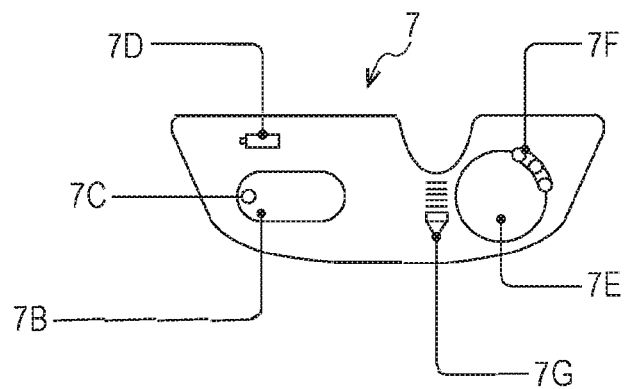
FIG. 2A is a view illustrating a configuration example of an operation panel unit that is provided on a front surface portion side of a housing illustrated in FIG. 1.
Figure 2B:
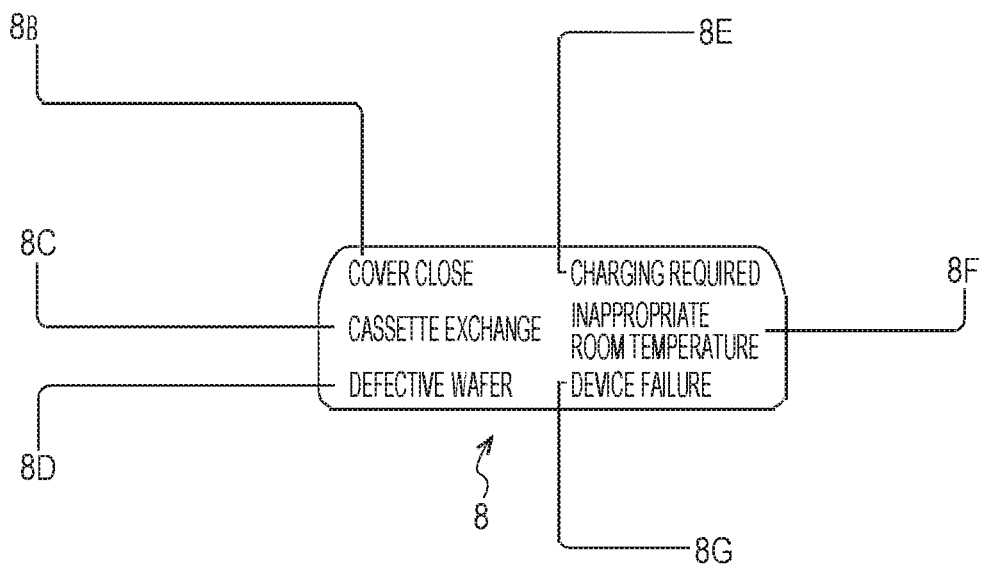

The housing 2 includes an upper side housing portion 2W, and a lower side housing portion 2V that is combined to the upper side housing portion 2W. As illustrated in FIGS. 2A to 2B, a housing-side clamp unit 50 is provided in an upper side housing portion 2W of the housing 2.

A tube setting assisting tool 4 is detachably attached to the housing 2. The housing 2, the clamp cover section 3, and the tube setting assisting tool 4 are formed from, for example, a hard plastic, but there is no particular limitation to a material, and the like.

As described later, the housing 2 accommodates respective constituent elements of the tube joining device 1. The clamp cover section 3 is disposed at an upper portion of the housing 2.

For example, the housing 2 and the clamp cover section 3 can be set to a bright color with a relatively high luminosity, specifically, a cream color or a white color. In addition, for example, the tube setting assisting tool 4 may be set to an orange color so that a user (a patient who actually uses the tube joining device, or the like) can visually clearly distinguish the housing 2, the clamp cover section 3, and the tube setting assisting tool 4. However, colors of the respective units are not particularly limited, and may be arbitrarily selected.

A speaker SP that emits sound, and a fan FN that discharges a gas inside the housing 2 are disposed on a bottom surface portion 2A of the housing 2 (refer to FIG. 3). The fan FN also has a function as a cooling fan that cools down the wafer WF after terminating a joining operation. In addition, in the bottom surface portion 2A of the housing 2, a voice opening that outputs a voice guidance, an alarm sound, and the like which are emitted from the speaker SP to the outside of the housing 2 may be provided, or an exhaust opening for compulsorily emitting heat generated inside the housing 2 or a gas that passes through the inside of the housing 2 to the outside of the housing 2 when the cooling fan FN is operated may be provided.

Next, description will be given of an operation panel unit 7 and a display unit 8 with reference to FIGS. 2A to 2B.

FIG. 2A illustrates the operation panel unit 7 that is provided on a front surface 2B side of the housing 2 illustrated in FIG. 1. FIG. 2B illustrates the display unit 8 that is provided on an upper surface portion 2D of the housing 2 illustrated in FIG. 1.

The operation panel unit 7 illustrated in FIG. 2A includes a [power] switch button 7B, [power] lamp 7C, a [in-charging] lamp 7D, a [joining] button 7E, a [joining] lamp 7F, and a [wafer ejecting] lamp 7G.

The [power] lamp 7C, the [in-charging] lamp 7D, the [joining] lamp 7F, and the [wafer ejecting] lamp 7G are display lamps indicating various states in the operation panel unit 7. For example, the respective lamps can be constituted by a green light-emitting diode (LED) lamp.

The [power] switch button 7B is a button that is pressed to supply power to the tube joining device 1. The [power] lamp 7C is lightened when pressing the [power] switch button 7B.

The [joining(welding)] button 7E is a button that is pressed when a user initiates fusing-joining work of fusing ends of the tubes T1 and T2 and replacing and pressure-joining the ends of the tubes T1 and T2. The [joining] lamp 7F is lightened when the [joining] button 7E is pressed. In addition, the [joining] lamp 7F may be configured to be flickered to give an alarm of a failure state to a user at the time of failure of the tube joining device 1.

The [in-charging] lamp 7D is lightened in a case where charging with respect to a battery BA illustrated in FIG. 3 from a commercial AC power side is performed.

The [wafer ejecting] lamp 7G is lightened or flickered when joining between the tubes T1 and T2 is terminated, and it enters a state in which a user can eject and discharge the wafer WF that has been used from the housing 2.

The display unit 8 illustrated in FIG. 2B includes a [cover close] lamp 8B, a [wafer cassette exchange] lamp 8C, a [defective wafer] lamp 8D, a [charging required] lamp 8E, an [inappropriate room temperature] lamp 8F, and a [device failure] lamp 8G.

The [device failure] lamp 8G is an alarm lamp that gives a notification of failure of the tube joining device 1. For example, the [device failure] lamp 8G can be constituted by a red LED lamp. The other lamps are constituted as an alarm display lamp, and can be constituted by, for example, a yellow LED lamp.

When referring to FIG. 1 again, a wafer cassette insertion portion 20 and a wafer cassette ejecting button 21 are provided on a lateral surface portion 2C of the housing 2.

The wafer cassette insertion portion 20 is constituted by a rectangular opening for inserting a wafer cassette WC illustrated in FIG. 1 in a detachable manner. In a state in which the wafer cassette WC is inserted into the housing 2 through the wafer cassette insertion portion 20, when a user pushes the wafer cassette ejecting button 21 with a finger, the wafer cassette WC can be taken out to the outside of the housing 2 through the wafer cassette insertion portion 20. The wafer cassette WC is constituted by a container which stores a plurality of wafers WF which are used in fusing of the tubes T1 and T2.

Next, the tubes T1 and T2 which become a joining target will be described.

FIG. 14 illustrates two tubes T1 and T2 which are joined by the tube joining device 1. As the tube T1 and T2, for example, a vinyl chloride tube can be selected. However, the material of the tubes T1 and T2 is not limited as long as the tubes T1 and T2 can be joined to each other through fusing and pressing. For example, materials of the tubes T1 and T2 may be different from each other.

As illustrated in FIG. 14, a predetermined connector CT is attached to a tip end of the first tube T1. The first tube T1 is connected to a dialysis fluid tube TBL of a dialysis fluid bag BL through a diverging tube 9. In addition, the first tube T1 is connected to a fluid discharge tube THL of a fluid discharge bag HL through the diverging tube 9.

The tube T2 includes an extension tube 10 and a protection tube 11. The extension tube 10 is connected to a peritoneal catheter 15 through a connection tube 12, a silicone tube 13, and a catheter joint 14. One end side of the peritoneal catheter 15 is inserted into an abdominal cavity of the user M.

Figure 15A:
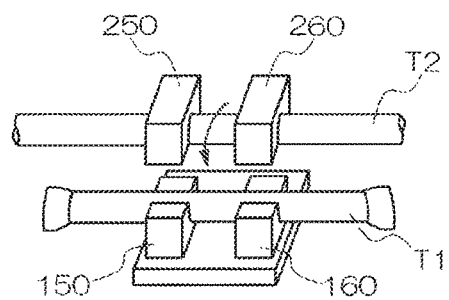
Figure 15B:
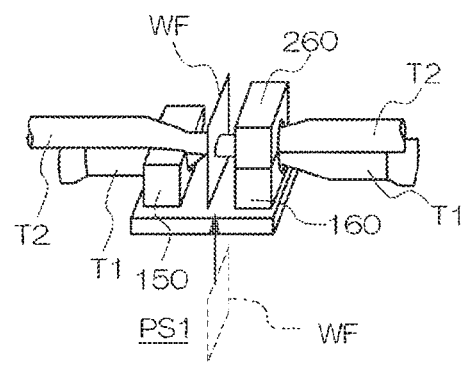

The tube joining device 1 fuses a joining portion W1 of the first tube T1 and a joining portion W2 of the second tube T2 by using a heated wafer WF in a state in which the first tube T1 and the second tube T2 are superimposed on each other (refer to FIGS. 15A and 15B. In addition, after the fusing, a fused end of the first tube T1 and a fused end of the second tube T2 are replaced, and the ends are pressed and joined (refer to FIGS. 15C and 15D).

In addition, before carrying out the joining work by the tube joining device 1, the second tube T2 is held by the clamp cover section 3 so as not to cause a positional deviation. On the other hand, the first tube T1 is held in the housing-side clamp unit 50 provided in the housing 2 so as not to cause a positional deviation. In a state in which the tubes T1 and T2 are held in the tube joining device 1, through work of closing the clamp cover section 3 (work of causing the clamp cover section 3 to relatively approach the housing 2), the tubes T1 and T2 are set in a superimposing state in which the second tube T2 is set to an upper side and the first tube T1 is set to a lower side (refer to FIGS. 15A and 15B). After the setting, the tubes T1 and T2 are fused by using a predetermined heated wafer WF. Details of the structure of holding the tubes T1 and T2 will be described later.

As illustrated in FIG. 1, a take-out port 58 through which the wafer WF that has been used in the fusing is delivered is provided in the vicinity of the operation panel unit 7 of the housing 2. The take-out port 58 is disposed on an extended line of a predetermined gap 57 (refer to FIG. 6) through which the wafer WF passes. Since the take-out port 58 is provided on the extended line of the gap 57, a user can easily take out the wafer WF that is guided to the take-out port 58 by pinching the wafer WF with fingers. An interlock 60 that maintains a closed state of the clamp cover section 3 and a detection sensor 89 which detects an opened or closed state of the clamp cover section 3 during fusing and joining the tubes T1 and T2 are provided in the vicinity of the take-out port 58 (refer to FIG. 3 and FIG. 4).

FIG. 3 is a perspective view illustrating a schematic arrangement example of constituent elements which are disposed in the housing 2 of the tube joining device 1.

As illustrated in FIG. 3, a main substrate 80, a DC input substrate 81, a wafer cassette storage unit 82, a wafer delivery unit 83, a movable clamp unit 71, a solenoid 61, the speaker SP, the fan FN, and a battery BA are accommodated in the housing 2.

For example, it is preferable that the DC input substrate 81 is disposed at a position spaced away from the main substrate 80 as much as possible. The reason for this is to prevent noise from the DC input substrate 81 from having an effect on circuit elements mounted on the main substrate 80.

Next, a function of a control unit 100 of the tube joining device 1 will be described with reference to FIG. 4. FIG. 4 illustrates an electric block of the tube joining device 1.

The tube joining device 1 includes a control unit 100 that collectively controls operations of respective units of the device. The control unit 100 includes a CPU such as a microcomputer, a ROM that stores a control program of the entirety of the device which is executed by the CPU or various pieces of data, and a RAM that temporarily stores measurement data or various pieces of data as a work area.

The control unit 100 is supplied with power from the battery BA on the DC input substrate 81 side. The DC input substrate 81 includes a jack 84 and a switching switch 85.

When being connected to a connection pin 86P of a charger 86, the jack 84 receives a predetermined DC power that is AC/DC converted from a commercial AC power supply. Furthermore, the charger 86 and the jack 84 are also illustrated in FIG. 1.

The switching switch 85 connects the jack 84 and the battery BA. DC power from the charger 86 can be used in charging of the battery BA. In addition, the DC power charged in the battery BA is supplied to the control unit 100.

A temperature sensor 87 such as a thermistor is electrically connected to the control unit 100. The temperature sensor 87 detects an environment temperature (outside air temperature) around the housing 2, and supplies outside air temperature information TF to the control unit 100. When heating the tubes T1 and T2, the control unit 100 refers to the outside air temperature information TF, and for example, in a case where the outside air temperature is lower than a temperature that is determined in advance, the control unit 100 executes processing of lengthening a heating time of the tubes T1 and T2. In addition, for example, the control unit 100 performs operation control so that a user is notified of the environment temperature with the speaker SP.

As illustrated in FIG. 4, the [power switch] button 7B, the [joining] button 7E, and the lamps 7C, 7D, 7F, and 7G of the operation panel unit 7 which are illustrated in FIG. 2A are electrically connected to the control unit 100.

The speaker SP is electrically connected to the control unit 100 through a voice synthesis unit 88. The speaker SP emits, for example, a voice guidance that is determined in advance in accordance with a command of the control unit 100.

A voice adjusting volume 22 and a voice/message switching switch 23 are electrically connected to the control unit 100. In a case where the voice/message switching switch 23 is "turned on", a voice guidance can be emitted from the speaker SP, and in a case where the voice/message switching switch 23 is "turned off", it is possible to sound a buzzer (not illustrated).

As illustrated in FIG. 4, the [cover close] button 8B, the [wafer cassette exchange] lamp 8C, the [defective wafer] lamp 8D, the [charging required] lamp 8E, the [inappropriate room temperature] lamp 8F, and the [device failure] lamp 8G of the display unit 8 illustrated in FIG. 2B are configured to be lightened or flickered in accordance with a command of the control unit 100.

The control unit 100 controls an operation of the interlock 60 to switch a lock state or an unlock state of the clamp cover section 3 from each other.

The wafer cassette storage unit 82 includes a wafer presence/absence sensor 101 and a wafer residual amount detection sensor 102. The wafer presence/absence sensor 101 is a sensor that detects whether or not the wafer WF remains in the wafer cassette WC illustrated in FIG. 1. The wafer residual amount detection sensor 102 is a sensor that detects how many sheets of wafers WF remain in the wafer cassette WC illustrated in FIG. 1, that is, the number of sheets of remaining wafer WF. As the wafer presence/absence sensor 101 and the wafer residual amount detection sensor 102, for example, a known photosensor or the like can be used.

The wafer delivery unit 83 is a unit that linearly moves the wafer WF in the wafer cassette WC to a predetermined stand-by position PS1 (refer to FIG. 15B). The wafer delivery unit 83 includes a motor 103, a motor drive 104, a forward edge sensor 105, an intermediate sensor 106, and a backward edge sensor 107. When receiving a command from the control unit 100, the motor drive 104 drives the motor 103, and linearly moves the wafer in the wafer cassette WC to the stand-by position PS1 sheet by sheet.

The control unit 100 is electrically connected to a wafer heating heater 110, a motor drive 111, a cam motor sensor 112, a clamp motor sensor 113, a microswitch 114, a wafer current detection unit 115, a wafer voltage detection unit 116, and the fan FN. When the motor drive 111 receives a command from the control unit 100, the motor drive 111 drives the cam motor 117 or the clamp motor 56 to fuse and join the tubes T1 and T2.

The cam motor 117 performs an operation of vertically moving the wafer WF, and an operation of pressing the two tubes T1 and T2 against each other. The operation of vertically moving the wafer WF by the cam motor 117 is an operation of ascending the wafer WF from the stand-by position PS1 to a fusing position PSm on an upward side of the stand-by position PS1, and a descending the wafer WF from the fusing position PSm to the stand-by position PS1 in a contrast manner (refer to FIGS. 15C and 15D). In addition, the cam motor 117 performs an operation of pressing the tubes T1 and T2 against each other after fusing the tubes T1 and T2. The pressing operation is an operation of causing the wafer WF to enter a stand-by state by descending the wafer WF from the fusing position PSm to the stand-by position PS1, and of pressing and joining the fused end of the first tube T1 and the fused end of the second tube T2 by pressing each of the fused ends against a fused end of a counterpart tube.

The clamp motor 56 performs rotation of the movable clamp unit 71 by 180° and returning rotation after the rotation by 180° (refer to FIG. 6).

The cam motor sensor 112 is constituted by, for example, a photosensor that detects a cam position and the original point. The clamp motor sensor 113 is constituted by, for example, a photosensor that detects the original point during rotation of the movable clamp unit 71.

The wafer heating heater 110 is provided to heat a wafer in accordance with a command from the control unit 100. When supplying power, the wafer current detection unit 115 detects a wafer current value that is supplied to the wafer. In addition, the wafer voltage detection unit 116 detects a wafer voltage value that is supplied to the wafer.

Next, the wafer cassette storage unit 82 and the wafer cassette WC will be described with reference to FIGS. 5A to 5B.

As illustrated in FIGS. 5A and 5B, the wafer cassette WC is constituted by a container for accommodating a plurality of sheets of the wafers WF. The wafer cassette WC is preferably formed from a transparent plastic to visually confirm an inner side of the wafer WF.

The wafer cassette WC includes a top surface portion 120, a bottom surface portion 121, a front surface portion 122, lateral surface portions 123 and 124, and a bottom surface portion 125.

The wafer WF is disposed sheet by sheet on an inner side of the front surface portion 122. In addition, as illustrated in FIG. 5B, when pressing a pushing member 126 with respect to the wafer WF in a Y1 direction, one sheet of wafer WF is pushed out from the inside of the wafer cassette WC to a predetermined stand-by position PS1 along the Y1 direction.

As illustrated in FIGS. 5A and 5B, two springs 128 and a spring accommodation member 129 are accommodated at the inside of the wafer cassette WC. One end of each of the two springs is supported to an inner surface of the bottom surface portion 125 of the wafer cassette WC. On the other hand, the other end of each of the two springs is supported to the spring accommodation member 129. The spring accommodation member 129 includes a positional deviation preventing portion 130 in order for each of the springs 128 not to deviate.

The two springs 128 press a plurality of sheets of the wafers WF against an inner surface of the front surface portion 122 through the spring accommodation member 129. In a state in which the wafers WF are held by the two springs 128, when the pushing member 126 is pressed against the wafer WF located on the front surface portion 122 side in the Y1 direction, only one sheet of the wafer WF located on the outermost side is output from the inside of the wafer cassette WC along the Y1 direction.

As illustrated in FIG. 5A, the wafer WF that can be used as a cutting member is constituted by a copper metal plate (a thickness: approximately 0.3 mm, a width: approximately 34 mm, and a height: approximately 13 mm) that can be heated by the wafer heating heater 110 (refer to FIG. 4 and FIG. 14) and is formed in a substantially rectangular shape. Furthermore, the wafer WF has two contact points 131 which are connected to the wafer heating heater 110 when being heated.

Next, description will be given of a configuration of the housing-side clamp unit 50 that holds and superimposes the tubes T1 and T2 on each other in the tube joining device 1 and the clamp cover section 3. FIG. 6 and FIG. 7 are perspective views illustrating a state in which the clamp cover section 3 is opened or closed, and FIG. 8 to FIG. 15A to 15D are side views and partial enlarged views when viewed from an arrow J1 direction in FIG. 1.

As illustrated in FIG. 6, the housing-side clamp unit 50 of the housing 2 includes a first accommodation member 150 that can accommodate the first tube T1, and a first tube holding portion 160 that can hold the first tube T1.

The first accommodation member 150 and the first tube holding portion 160 are disposed in a disposition direction (extension direction) of the first tube T1 with a predetermined interval. The first accommodation member 150 includes a substantially U-shaped groove 151.

The first tube holding portion 160 includes a clamp portion 161 that grips (pinches) the first tube T1, and protrusions 165 and 166 which protrude upward. The clamp portion 161 includes a first clamp member 162 and a second clamp member 163.

The first tube T1 is disposed so that a part thereof is suspended in a groove 151 of the first accommodation member 150, and is held by the first tube holding portion 160. A biasing force is applied to the clamp members 162 and 163 in a direction of closing a gap between the members in a state in which a force from the outside does not act. According to this, when causing the first tube T1 to be held by the first tube holding portion 160, a user expands tip end portions of the clamp members 162 and 163. In addition, the user disposes the first tube T1 between the clamp members 162 and 163, and performs an operation of releasing the operation of expanding the tip end portions. Furthermore, for example, a structure of applying a biasing force to the clamp members 162 and 163 may be constituted by a known elastic member such as a spring, and the like. The first tube T1 is held in the housing-side clamp unit 50 in a state of being supported in the groove 151, and being fixed by the first tube holding portion 160. One end side of the first tube T1 is led out to the outside of the first tube holding portion 160 through a groove 161A of the first tube holding portion 160.

As in the housing-side clamp unit 50, a tube holding structure is provided in the clamp cover section 3. As illustrated in FIG. 6 and FIG. 8, the clamp cover section 3 includes a clamp plate 30 (corresponding to a "tube superimposing portion"), a second tube holding portion 230 that can hold the second tube T2, a switching mechanism 240 that can switch holding of the second tube T2 by the second tube holding portion 230 and release of the holding, and a first accommodation member 250 and a second accommodation member 260 which are disposed in a disposition direction (extension direction) of the second tube T2 from the second tube holding portion 230.

Superimposing of the tubes T1 and T2 by the clamp plate 30, and the switching by the switching mechanism 240 to a state in which holding of the second tube T2 is released are performed in synchronization with an operation of closing the clamp cover section 3.

The clamp plate 30 causes the second tube holding portion 230 to relatively approach the first tube holding portion 160, thereby disposing the first tube T1 and the second tube T2 in a superimposed manner. The clamp plate 30 is attached to the housing 2 to be opened with a central axis CL1 as the center by an angle greater than 90° as illustrated in FIG. 6 from a closed state as illustrated in FIG. 7.

As illustrated in FIG. 8, the second tube holding portion 230 includes a first claw portion (first hook portion) 231 and a second claw portion 232 which can approach each other or can be separated from each other in accordance with an opening/closing operation of the clamp cover section 3, and a support portion 233 that supports the first claw portion 231 and the second claw portion 232 to rotate around a central axis CL2 (rotation axis).

In addition, a hook portion 231B, which is curved to cover a part of an outer periphery of the second tube T2 in a state in which the claw portions 231 and 232 are closed, is provided at a tip end portion of the first claw portion 231. In a state in which the claw portions 231 and 232 are closed, the central axis CL2, the second tube T2, and the hook portion 231B are disposed on the same straight line L1. According to this, in the course of closing the clamp cover section 3 from an opened state, it is possible to more reliably prevent the second tube T2 from being detached from the second tube holding portion 230 due to an influence such as an own weight.

The switching mechanism 240 is configured to apply a biasing force for maintaining a state in which the second tube T2 is held to the second tube holding portion 230, and to apply a biasing force for maintaining a state in which the holding of the second tube T2 is released to the second tube holding portion 230 in accordance with relative approaching of the first tube holding portion 160 and the second tube holding portion 230.

The switching mechanism 240 includes a first biasing member 241 that applies a biasing force to the first claw portion 231, a second biasing member 242 that applies a biasing force to the second claw portion 232, and an auxiliary switching portion 243. The first biasing member 241 and the second biasing member 242 can be constituted by a known elastic member such as a spring, and the like.

The first biasing member 241 is provided to be stretchable along an approaching/separation direction of the first claw portion 231 and the second claw portion 232. In the first biasing member 241, one end 241A is fixed to the first claw portion 231 and the other end 241B is fixed to the clamp plate 30. An installation direction of the first biasing member 241 can be switched to apply a biasing force from a direction (an arrow C1 direction in FIG. 8) in which the first claw portion 231 is caused to approach the second claw portion 232 to a direction (an arrow O1 direction in FIG. 9 and FIG.

10) in which the first claw portion 231 is caused to be separated from the second claw portion 232 due to contact between the protrusion 165 of the first tube holding portion 160 and the first claw portion 231 of the second tube holding portion 230.

The second biasing member 242 is provided to intersect the first biasing member 241, and to be stretchable along the approaching/separation direction of the first tube holding portion 160 and the second tube holding portion 230. The second biasing member 242 applies a biasing force in a direction (an arrow C2 direction in FIG. 8) in which the second claw portion 232 is caused to approach the first claw portion 231. An installation direction of the second biasing member 242 can be switched to apply a biasing force from a direction (the arrow C2 direction in FIG. 8) in which the second claw portion 232 is caused to approach the first claw portion 231 to a direction (an arrow O2 direction in FIG. 10) in which the second claw portion 232 is caused to be separated from the first claw portion 231 due to contact between the protrusion 166 of the first tube holding portion 160 and the second claw portion 232 of the second tube holding portion 230.

In a state in which the first tube holding portion 160 is separated from the second tube holding portion 230, that is, in a state in which the clamp cover section 3 is opened as illustrated in FIG. 8, a virtual line K1 connecting the one end 241A and the other end 241B of the first biasing member 241 is provided on a side in which the second tube holding portion 230 is disposed in comparison to the central axis CL2. In this state, the first biasing member 241 applies a biasing force in a direction (the arrow C1 direction in FIG. 8) in which the first claw portion 231 is caused to approach the second claw portion 232. In addition, the second biasing member 242 applies a biasing force toward a direction (the arrow C2 direction in FIG. 8) in which the second claw portion 232 is caused to approach the first claw portion 231.

As described above, in a state in which the first tube holding portion 160 is separated from the second tube holding portion 230, the first biasing member 241 and the second biasing member 242 apply the biasing forces toward directions (the arrow C1 direction and the arrow C2 direction in FIG. 6) of closing the first claw portion 231 and the second claw portion 232. According to this, a state in which the first claw portion 231 and the second claw portion 232 are closed is maintained, and thus the second tube T2 can be held by the second tube holding portion 230. According to this, in the course of closing the clamp cover section 3 from an opened state, it is possible to prevent the second tube T2 from being detached from the second tube holding portion 230 due to an influence such as an own weight.

In a state in which the first tube holding portion 160 and the second tube holding portion 230 approach each other, that is, a state immediately before the clamp cover section 3 is closed as illustrated in FIG. 10, or a state in which the clamp cover section 3 is closed as illustrated in FIG. 11, in the first biasing member 241, the virtual line K1 is provided on a side opposite to the side in which the second tube holding portion 230 is disposed in comparison to the central axis CL2. In this state, the first biasing member 241 applies a biasing force in a direction (the arrow O1 direction in FIG. 10 and FIG. 11) in which the first claw portion 231 is separated from the second claw portion 232. In addition, the second biasing member 242 applies a biasing force in a direction (the arrow O2 direction in FIG. 10 and FIG. 11) in which the second claw portion 232 is separated from the first claw portion 231.

As described above, in a state in which the first tube holding portion 160 and the second tube holding portion 230 approach each other, the first biasing member 241 and the second biasing member 242 apply the biasing forces toward directions (the arrow O1 direction and the arrow O2 direction in FIG. 10 and FIG. 11) in which the first claw portion 231 and the second claw portion 232 are opened. According to this, it is possible to maintain a state in which the first claw portion 231 and the second claw portion 232 are opened to maintain a state in which holding of the second tube T2 by the second tube holding portion 230 is released. According to this, in the fusing work and the joining work of the tubes T1 and T2, the second tube holding portion 230 does not interfere movement of the second tube T2, and thus it is possible to smoothly perform the fusing work and the joining work.

The auxiliary switching portion 243 switches the second tube holding portion 230 from a state in which holding of the second tube T2 can be released to a state in which holding of the second tube T2 is possible in synchronization with an operation of opening the clamp cover section 3 as illustrated in FIG. 12 and FIG. 13 from a state in which the clamp cover section 3 is closed as illustrated in FIG. 11.

As illustrated in FIG. 6, the first accommodation member 250 includes a substantially U-shaped groove 250A. The groove 250A is provided to suspend and hold the second tube T2 when disposing the second tube T2 in the clamp cover section 3.

As illustrated in FIG. 6, the second accommodation member 260 includes a substantially U-shaped groove 260A, a concave portion 265 that is inwardly recessed in a concave shape, and a convex portion 266 that outwardly protrudes in a convex shape. As in the groove 250A that is provided in the first accommodation member 250, the groove 260A is provided to suspend and hold the second tube T2. The concave portion 265 is a portion that accommodates a convex portion 160A of the first tube holding portion 160 of the housing-side clamp unit 50. In addition, the convex portion 266 is a portion that is accommodated in a concave portion 160B of the first tube holding portion 160 of the housing-side clamp unit 50. When the clamp cover section 3 is closed along a direction indicated by an arrow RS in FIG. 6, the concave portion 265 faces the convex portion 160A, and the convex portion 160A is inserted into the concave portion 265. In addition, the convex portion 266 faces the concave portion 160B, and the convex portion 266 is inserted into the concave portion 160B. According to this, the second accommodation member 260 of the clamp cover section 3 and the first tube holding portion 160 of the housing-side clamp unit 50 are integrated with each other. The second accommodation member 260 and the first tube holding portion 160 which are integrated with each other form the movable clamp unit 71 that replaces ends of the tubes T1 and T2 which are fused by the wafer WF.

Furthermore, with regard to the shape and the size of the tube holding portions or the accommodation members which are constructed in the respective portions of the housing-side clamp unit 50 and the clamp cover section 3, the shape and the like are not particularly limited as long as the tubes T1 and T2 can be held or accommodated. In addition, for example, an inclined guide surface and the like can also be formed at the periphery of the tube holding portions or the accommodation portions to easily perform setting of the tubes T1 and T2 in the grooves.

As is simply illustrated in a broken line portion in FIG. 6, for example, a predetermined gear 55 can be formed at the periphery of the second accommodation member 260 of the clamp cover section 3 and at the periphery of the first tube holding portion 160 of the housing-side clamp unit 50. In addition, the gear 55 can be configured to engage with a gear 56G of the clamp motor 56 that drives an operation of replacing positions of ends of the tubes T1 and T2 after fusing the tubes T1 and T2.

Figure 15C:
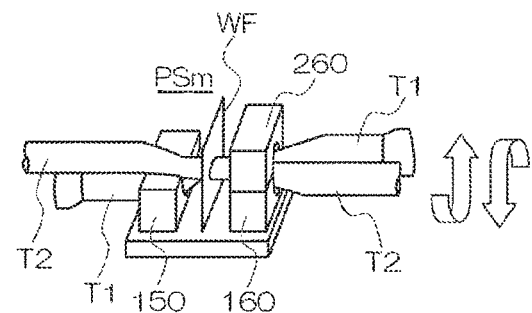

For example, when the clamp motor 56 operates by a command of a control unit 100 (refer to FIG. 4) and rotates the gear 56G, the second accommodation member 260 of the clamp cover section 3 and the first tube holding portion 160 of the housing-side clamp unit 50 positively rotate by 180° or reversely rotate by 180° in an integrated state. In addition, as illustrated in FIG. 15C, during the rotation, one end side (the right side in the drawing) of the first tube T1 and the second tube T2 which are fused rotates, and the other end side is pressed by the first accommodation member 250 of the clamp cover section 3 and the first accommodation member 150 of the housing-side clamp unit 50 and is held therebetween. As a result, a position of the end of the first tube T1 after being fused and a position of the end of the second tube T2 after being fused are vertically reversely rotated by 180°. According to this, one end of the second tube T2 is located on an upper side and one end of the first tube T1 is located on a lower side before being fused, but the one end of the first tube T1 is located on an upper side and the one end of the second tube T2 is located on a lower side after being fused.

When setting the first tube T1 in the housing-side clamp unit 50, for example, the setting can be carried out through simple work only by setting the clamp cover section 3 to an opened state as illustrated in FIG. 6, and by pushing the first tube T1 from upward sides of the first accommodation member 150 and the first tube holding portion 160. In addition, when setting the second tube T2 in the clamp plate 30, for example, the setting can be carried out through simple work only by setting the clamp cover section 3 to an opened state as illustrated in FIG. 6, by operating the second tube holding portion 230 to grip the second tube T2, and by pushing the second tube T2 from downward sides of the accommodation members 250 and 260. Furthermore, a gap 57 that is formed between the first accommodation member 150 and the first tube holding portion 160 is a portion through which the wafer WF is guided when fusing the tubes T1 and T2.

As illustrated in FIG. 9 and FIG. 10, when causing the clamp plate 30 to approach the housing-side clamp unit 50 along the arrow RS, in accordance with the approaching movement, the second tube holding portion 230 provided in the clamp plate 30 relatively approaches the first tube holding portion 160 provided in the housing-side clamp unit 50. According to this, as illustrated in FIG. 11, the second tube T2 that is held by the second tube holding portion 230 is superimposed on the first tube T1 that is held by the first tube holding portion 160, and the tubes are disposed in a close contact state. As described above, before the fusing-joining work is carried out, it is not necessary for a user to manually superimpose the tubes T1 and T2 by himself, and in a state in which the tubes T1 and T2 are held by the holding portions 160 and 230, it is possible to terminate preparation by a simple operation of closing the clamp cover section 3. As illustrated in FIG. 7, when the clamp cover section 3 is closed, the inside of the clamp plate 30 and the inside of the housing-side clamp unit 50 are isolated from the outside. Accordingly, it is possible to perform fusing and joining of the tubes T1 and T2 disposed between the clamp plate 30 and the housing-side clamp unit 50 in an aseptic condition.

Next, description will be given of an operation of switching holding of the second tube T2 by the second tube holding portion 230 and releases of the holding in accordance with an opening/closing operation of the clamp cover section 3.

First, a user causes the second tube T2 to be held by the second tube holding portion 230. At this time, biasing forces are applied to the claw portions 231 and 232 in directions (the arrows C1 and C2 in FIG. 8) of closing the first claw portion 231 and the second claw portion 232 by the first biasing member 241 and the second biasing member 242. According to this, the user grips the first claw portion 231 and rotates the first claw portion 231 in the arrow O1 direction in FIG. 11 to widen a distance between tip ends of the claw portions 231 and 232. In addition, after disposing the second tube T2 between the claw portions 231 and 232, when the user releases the gripping of the first claw portion 231, the claw portions 231 and 232 return to the originally closed state. According to this, as illustrated in FIG. 8, the user can cause the second tube T2 to be held by the second tube holding portion 230.

Furthermore, in a case where a tube is erroneously set in the second tube holding portion 230, when detaching the tube from the second tube holding portion 230, it is possible to detach the tube by closing the clamp cover section 3 once to release holding by the second tube holding portion 230.

When performing joining work, if the user rotates the clamp plate 30 around the central axis CL1 in the arrow RS direction, as illustrated in FIG. 9, the first claw portion 231 of the second tube holding portion 230 that is provided in the clamp plate 30 comes into contact with (abuts on) the protrusion 165 of the first tube holding portion 160 that is provided in the housing-side clamp unit 50. In a state in which the first claw portion 231 and the protrusion 165 come into contact with each other, when further rotating the clamp plate 30 in the arrow RS direction to close the clamp cover section 3, the first claw portion 231 is pushed up by the protrusion 165, and thus the first claw portion 231 rotates around the central axis CL2 in the arrow O1 direction. According to this, the first claw portion 231 moves in a direction (the arrow O1 direction in FIG. 9) of being separated from the second claw portion 232.

In addition, when rotating the clamp plate 30 around the central axis CL1 in the arrow RS direction, as illustrated in FIG. 10, the second claw portion 232 comes into contact with (abuts on) the protrusion 166 of the first tube holding portion 160 that is provided in the housing-side clamp unit 50. In a state in which the second claw portion 232 and the protrusion 166 come into contact with each other, when further rotating the clamp plate 30 in the arrow RS direction to close the clamp cover section 3, the second claw portion 232 is pushed up by the protrusion 166, and thus the second claw portion 232 rotates around the central axis CL2 in the arrow O2 direction. According to this, the second claw portion 232 moves in a direction (the arrow O2 direction in FIG. 10) of being separated from the first claw portion 231.

When the first claw portion 231 and the second claw portion 232 move in directions to be opened (the arrow O1 direction and the arrow O2 direction in FIG. 10), holding of the second tube T2 by the second tube holding portion 230 is released. Similarly, in synchronization with the operation of closing the clamp cover section 3, in the clamp portion 161 of the first tube holding portion 160, the first clamp member 162 and the second clamp member 163 respectively come into contact with surfaces 31 and 32 of the clamp cover section 3, and the first clamp member 162 and the second clamp member 163 move in directions to be opened, and thus holding of the first tube T1 is released.

When the first claw portion 231 and the second claw portion 232 move in directions to be opened (the arrow O1 direction and the arrow O2 direction in FIG. 11), in a state in which the clamp cover section 3 is closed as illustrated in FIG. 11, a direction of the biasing force by the first biasing member 241 with respect to the first claw portion 231 is changed from a direction (the arrow C1 direction in FIG. 11) in which the first claw portion 231 is caused to approach the second claw portion 232 to a direction (the arrow O1 direction in FIG. 11) in which the first claw portion 231 is separated from the second claw portion 232. According to this, it is possible to stably maintain a state in which the claw portions 231 and 232 are opened.

When opening the clamp cover section 3 after completing the joining work, since the first claw portion 231 is pressed by the first biasing member 241 in a direction (the O1 direction in FIG. 11) in which the first claw portion 231 is separated from the second claw portion 232, the claw portions 231 and 232 maintain an opened state. According to this, as illustrated in FIG. 12, the second tube T2 remains on a lower side in a state of being superimposed on the first tube T1, and thus it is easy to take out the second tube T2. In addition, when opening the clamp cover section 3, the second tube T2 is not pulled by the second tube holding portion 230. Accordingly, the user can easily detach the tubes T1 and T2 which are joined.

In addition, when the clamp cover section 3 is opened, as illustrated in FIG. 12, a protrusion 231A of the first claw portion 231 comes into contact with the auxiliary switching portion 243. When the clamp cover section 3 is further opened from the above-described state, a force is applied to the protrusion 231A of the first claw portion 231 by the auxiliary switching portion 243 in a direction (arrow C1 direction in FIG. 12) of approaching the second claw portion 232. According to this, the first claw portion 231 moves in a direction of approaching the second claw portion 232, and as illustrated in FIG. 13, the claw portions 231 and 232 return to a closed state. As described above, in synchronization with the operation of opening the clamp cover section 3, the second tube holding portion 230 can automatically return to a state in which the claw portions 231 and 232 are closed, and thus it is possible to omit work of closing the claw portions 231 and 232.

Next, a work process of joining the tubes T1 and T2 will be described with reference to FIGS. 15A to 15D, FIGS. 16A to 16B, and other drawings. FIGS. 15A to 15D and FIGS. 16A to 16B are views schematically illustrating a flow of fusing-joining work by the tube joining device 1.

First, as illustrated in FIG. 6, a user lifts up the clamp cover section 3 of the tube joining device 1 in an arrow RT direction. In this state, the clamp cover section 3 is detached from the housing-side clamp unit 50, and the housing-side clamp unit 50 enters a state of being opened to the outside.

Next, as illustrated in FIG. 8, the user sets the second tube T2 in the second tube holding portion 230 of the clamp cover section 3, and sets the first tube T1 in the first tube holding portion 160 of the housing-side clamp unit 50. Furthermore, a procedure of setting the tubes T1 and T2 may be set to an opposite procedure.

Next, as illustrated in FIG. 9 and FIG. 15A, the user causes the clamp plate 30 to approach the housing-side clamp unit 50, and closes the clamp cover section 3. In addition, through the work, the second tube T2 that is held by the second tube holding portion 230 is superimposed on the first tube T1 that is held by the first tube holding portion 160. As described above, holding of the second tube T2 by the second tube holding portion 230 is released when the clamp plate 30 is closed.

The user pushes the joining button 7E of the operation panel unit 7 after closing the clamp cover section 3 (refer to FIG. 2A). Then, the fusing work by the wafer WF is initiated.

When the fusing work is initiated, as illustrated in FIG. 15B, the wafer WF moves to the stand-by position PS1 that is located on a downward side of the tubes T1 and T2 from the wafer cassette WC. At this time, the wafer WF is heated to, for example, approximately 300° C. through heating by the wafer heating heater 110. As illustrated in FIG. 15B the heated wafer WF ascends from the stand-by position PS1 indicated by a broken line to the fusing position PSm indicated by a solid line in accordance with an operation of the cam motor 117. As a result, the tubes T1 and T2 are fused by the wafer WF.

Next, as illustrated in FIG. 15C, the clamp motor 56 rotates the gear 56G (refer to FIG. 6). The second accommodation member 260 of the clamp cover section 3 and the first tube holding portion 160 of the housing-side clamp unit 50 rotate by 180° while holding the first tube T1 and the second tube T2. As a result, the fused end of the first tube T1 is disposed on an upper side, and the fused end of the second tube T2 is disposed on a lower side.

Figure 15D:
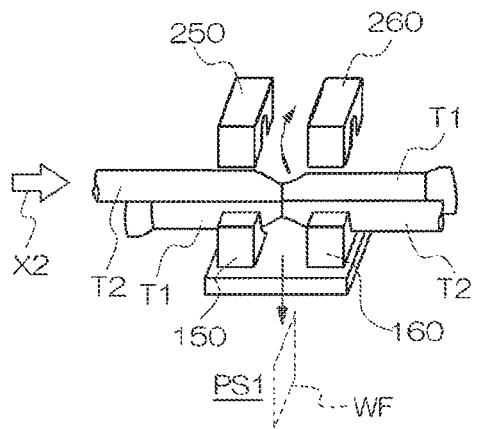

Next, as illustrated in FIG. 15D, the wafer WF descends from the fusing position PSm to the stand-by position PS1, and the tubes T1 and T2 which are located on a non-rotation side are pushed in an X2 direction. According to this, an end of the first tube T1 that is located on one side rotated by 180° is pressed and joined to an end of the second tube T2 on the other side that is not rotated. In addition, an end of the second tube T2 that is located on the one side rotated by 180° is pressed and joined to an end of the first tube T1 that is located on the other side that is not rotated. Then, the tubes T1 and T2 are cooled down, and thus joining is completed.

After the joining is completed, the wafer WF that has been used in the fusing is discharged to the take-out port 58. The user can take out the wafer WF that has been used from the take-out port 58 by pinching the wafer WF with fingers.

Then, as illustrated in FIG. 12, the user grips the clamp cover section 3 and lifts up the clamp cover section 3 in the arrow RT direction. In this case, the clamp cover section 3 is separated from the housing-side clamp unit 50. As illustrated in FIGS. 16A and 16B, the user detaches the tubes T1 and T2 which are joined from the housing-side clamp unit 50. As described above, it is possible to simply join the tube T1 on the dialysis fluid bag BL side and the tube T2 on the user M side as illustrated in FIG. 14 in an aseptic condition. Furthermore, it is also possible to construct the tube joining device 1 in such a manner that separation of the tubes T1 and T2 which remain in the housing-side clamp unit 50 after the joining work is performed, for example, in synchronization with the operation of lifting up the clamp cover section 3.

As described above, the tube joining device 1 according to this embodiment is a tube joining device that fuses an end of the first tube T1 and an end of the second tube T2 by the heated wafer WF (plate-shaped cutting member), and replaces the fused end of the first tube T1 and the fused end of the second tube T2 and joins the fused ends in an aseptic condition. The tube joining device 1 includes the first tube holding portion 160 that is capable of holding the first tube T1, a second tube holding portion 230 that is capable of holding the second tube T2, a clamp plate 30 (tube superimposing portion) that causes the first tube holding portion 160 and the second tube holding portion 230 to relatively approach each other to dispose the first tube T1 and the second tube T2 in a superimposed manner, and a switching mechanism 240 that is capable of switching holding of the second tube T2 by the second tube holding portion 230 and release of the holding. The switching mechanism 240 applies a biasing force for maintaining a state in which the second tube T2 is held to the second tube holding portion 230, and applies a biasing force for maintaining a state in which the holding of the second tube T2 is released to the second tube holding portion 230 in accordance with the relative approaching of the first tube holding portion 160 and the second tube holding portion 230.

According to the tube joining device 1 having the above-described configuration, a user individually sets the tubes T1 and T2 in the first and second tube holding portions 160 and 230, and performs an operation of causing the tube holding portions 160 and 230 to relatively approach each other. According to this, the user can easily and appropriately dispose the tubes T1 and T2 in a superimposed state. It is not necessary to manually perform work of superimposing the tubes T1 and T2 on each other, and thus it is possible to prevent a work error such as setting of the tubes in a distorted state from occurring, and it is possible to prevent a joining failure caused by a tube setting error from occurring in advance. Tube holding and release of the holding are realized by a simple device configuration including the switching mechanism 240.

In addition, the second tube holding portion 230 includes the first claw portion 231 and the second claw portion 232 which are capable of approaching each other or capable of being separated from each other, and the support portion 233 that rotatably supports the first claw portion 231 and the second claw portion 232. The switching mechanism 240 includes the first biasing member 241 that applies a biasing force to the first claw portion 231, and the second biasing member 242 that applies a biasing force to the second claw portion 232. The first biasing member 241 and the second biasing member 242 apply the biasing forces toward directions of closing the first claw portion 231 and the second claw portion 232 in a state in which the first tube holding portion 160 is separated from the second tube holding portion 230, and apply the biasing forces toward directions of opening the first claw portion 231 and the second claw portion 232 in a state in which the first tube holding portion 160 and the second tube holding portion 230 approach each other. According to this, in a state in which the first tube holding portion 160 is separated from the second tube holding portion 230, a state in which the first claw portion 231 and the second claw portion 232 are closed is maintained, and it is possible to reliably hold the second tube T2 by the second tube holding portion 230. According to this, in the course of causing the tube holding portions 160 and 230 to relatively approach each other to superimpose the tubes T1 and T2 on each other, it is possible to prevent the second tube T2 from being detached from the second tube holding portion 230 due to an influence such as an own weight. In addition, in a state in which the first tube holding portion 160 and the second tube holding portion 230 approach each other, a state in which the first claw portion 231 and the second claw portion 232 are opened is maintained, and it is possible to maintain a state in which holding of the second tube T2 by the second tube holding portion 230 is released. According to this, in the fusing and the joining work of the tube T1 and T2, the second tube holding portion 230 does not interfere movement of the second tube T2, and thus it is possible to smoothly perform the fusing work and the joining work.

In addition, the first biasing member 241 is provided to be stretchable along an approaching/separation direction of the first claw portion 231 and the second claw portion 232. The second biasing member 242 is provided to intersect the first biasing member 241, and to be stretchable along the approaching/separation direction of the first tube holding portion 160 and the second tube holding portion 230. An installation direction of the first biasing member 241 can be switched to apply the biasing force toward a direction in which the first claw portion 231 is caused to be separated from the second claw portion 232 due to contact between the first tube holding portion 160 and the second tube holding portion 230. Since the installation direction is switched in order for the first biasing member 241 to apply the biasing force to the first claw portion 231 in a direction of releasing holding of the second tube T2 due to contact between the first tube holding portion 160 and the second tube holding portion 230, it is possible to easily release holding of the second tube T2 by performing the operation of causing the tube holding portions 160 and 230 to relatively approach each other. In addition, since the second biasing member 242 is provided to intersect the first biasing member 241, it is possible to apply the biasing force to the second claw portion 232 in a direction intersecting a direction in which the first biasing member 241 applies the biasing force to the first claw portion 231. According to this, it is possible to more reliably perform holding of the second tube T2 and release of the holding.

In addition, the housing 2 in which the first tube holding portion 160 is provided, and the clamp cover section 3 (cover section) in which the second tube holding portion 230, the clamp plate 30 (tube superimposing portion), and the switching mechanism 240 are provided and which is provided to the housing 2 in an openable and closable manner are provided. Superimposition of the tubes T1 and T2 by the clamp plate 30, and switching by the switching mechanism 240 to the state in which holding of the second tube T2 is released are performed in synchronization with an operation of closing the clamp cover section 3. According to this, it is possible to simultaneously perform superimposition of the tubes T1 and T2 and preparation work for performing fusing work of the tubes T1 and T2 as a previous step by simple work of closing the clamp cover section 3, and convenience of a user is improved.

In addition, the switching mechanism 240 includes the auxiliary switching portion 243 that switches the second tube holding portion 230 from a state in which holding of the second tube T2 can be released to a state in which holding of the second tube T2 is possible in synchronization with an operation of opening the clamp cover section 3. Since the second tube holding portion 230 can be automatically returned to a state in which the claw portions 231 and 232 are closed in synchronization with the operation of opening the clamp cover section 3, it is possible omit work of closing the claw portions 231 and 232. According to this, it is possible to provide the tube joining device 1 of which convenience is further improved.

Hereinbefore, description has been given of the tube joining device according to the invention with reference to the embodiment, but the invention is not limited to the configuration described in the embodiment, and can be appropriately modified on the basis of the appended claims.

For example, the configuration of the housing or the respective portions of the tube joining device can be modified in correspondence with a use and a purpose of the device, design circumstances and the like, and thus there is no limitation to the configuration illustrated in the drawing.

For example, the work of superimposing the first tube and the second tube may be configured to be performed by relative approaching movement of the first tube holding portion and the second tube holding portion which respectively hold the tubes. For example, the configuration of the work may be changed so that the tubes are superimposed on each other by causing the first tube holding portion side to perform approaching movement without causing the second tube holding portion side to perform approaching movement.

In addition, the tubes which become a joining target may be tubes of which positions of ends after being fused are replaced with each other and are subjected to pressure-joining, and there is no limitation to the tubes used in the peritoneal dialysis.

In addition, description has been given of an example in which the first tube holding portion holds the first tube, and the second tube holding portion holds the second tube, but there is no limitation thereto. The first tube holding portion can hold the second tube, and the second tube holding portion can hold the first tube.

Priority is claimed on Japanese Patent Application No. 2017-059270, filed Mar. 24, 2017, the content of which is incorporated herein by reference.

The invention claimed is:

1. A tube joining device that fuses an end of a first tube and an end of a second tube in an aseptic condition, comprising:
   a plate-shaped cutting member;
   means for heating said cutting member;
      a first tube holding portion that is capable of holding a first tube on a first side of the cutting member;
      a second tube holding portion that is capable of holding a second tube on a second side of the cutting member;
      a tube superimposing portion that causes the first tube holding portion and the second tube holding portion to approach each other to dispose the first tube and the second tube in a superimposed manner; and
      a switching mechanism that is capable of switching the second tube holding portion from a state in which the second tube is held to a state in which the second tube is released,
   wherein the switching mechanism applies a first biasing force for maintaining the state in which the second tube is held, and applies a second biasing force for maintaining the state in which the second tube is released, the second biasing force being applied when the first tube holding portion and the second tube holding portion approach each other.

2. The tube joining device according to claim 1, wherein:
   the second tube holding portion includes a first claw portion and a second claw portion which are capable of approaching each other or capable of being separated from each other, and a support portion that rotatably supports the first claw portion and the second claw portion,
   the switching mechanism includes:
   a first biasing member that applies a third biasing force to the first claw portion, and
   a second biasing member that applies a fourth biasing force to the second claw portion, and
   the first biasing member and the second biasing member apply the third and fourth biasing forces toward directions of closing the first claw portion and the second claw portion, respectively, in a state in which the first tube holding portion is separated from the second tube holding portion, and apply the third and fourth biasing forces toward directions of opening the first claw portion and the second claw portion, respectively, in a state in which the first tube holding portion and the second tube holding portion approach each other.

3. The tube joining device according to claim 2, further comprising:
   a housing in which the first tube holding portion is provided; and
   a cover section in which the second tube holding portion, the tube superimposing portion, and the switching mechanism are provided, and which is coupled to the housing in an openable and closable manner,
   wherein switching by the switching mechanism from the state in which the second tube is held to the state in which the second tube is released is performed in synchronization with an operation of closing the cover section.

4. The tube joining device according to claim 3, wherein the switching mechanism includes an auxiliary switching portion that switches the second tube holding portion from a state in which holding of the second tube can be released to a state in which holding of the second tube is possible in synchronization with an operation of opening the cover section.

5. The tube joining device according to claim 2, wherein:
   the first biasing member is stretchable along a first approaching/separation direction of the first claw portion and the second claw portion,
   the second biasing member is positioned to intersect the first biasing member, and is stretchable along a second approaching/separation direction of the second claw portion and the first claw portion, and
   the tube joining device further comprises means for switching a direction of the third biasing force applied by the first biasing member from a direction in which the first claw portion is caused to approach the second claw portion to a direction in which the first claw portion is caused to be separated from the second claw portion due to contact between the first tube holding portion and the second tube holding portion.

6. The tube joining device according to claim 5, further comprising:
   a housing in which the first tube holding portion is provided; and
   a cover section in which the second tube holding portion, the tube superimposing portion, and the switching mechanism are provided, and which is coupled to the housing in an openable and closable manner,
   wherein switching by the switching mechanism from the state in which the second tube is held to the state in which the second tube is released is performed in synchronization with an operation of closing the cover section.

7. The tube joining device according to claim 6, wherein the switching mechanism includes an auxiliary switching portion that switches the second tube holding portion from a state in which holding of the second tube can be released to a state in which holding of the second tube is possible in synchronization with an operation of opening the cover section.

8. The tube joining device according to claim 1, further comprising:
   a housing in which the first tube holding portion is provided; and a cover section in which the second tube holding portion, the tube superimposing portion, and the switching mechanism are provided, and which is coupled to the housing in an openable and closable manner, wherein switching by the switching mechanism from the state in which the second tube is held to the state in which the second tube is released is performed in synchronization with an operation of closing the cover section.

9. The tube joining device according to claim 8, wherein the switching mechanism includes an auxiliary switching portion that switches the second tube holding portion from a state in which holding of the second tube can be released to a state in which holding of the second tube is possible in synchronization with an operation of opening the cover section.

\* \* \* \* \*